(12) United States Patent
Yoshida

(10) Patent No.: US 11,271,763 B2
(45) Date of Patent: Mar. 8, 2022

(54) INFORMATION PROCESSING SYSTEM, INFORMATION PROCESSING APPARATUS, AND INFORMATION PROCESSING METHOD

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/441,592

(22) Filed: Jun. 14, 2019

(65) Prior Publication Data

US 2019/0386841 A1 Dec. 19, 2019

(30) Foreign Application Priority Data

Jun. 19, 2018 (JP) .............................. JP2018-116517
May 20, 2019 (JP) .............................. JP2019-094703

(51) Int. Cl.
| | |
|---|---|
| *H04L 12/18* | (2006.01) |
| *G06F 16/955* | (2019.01) |
| *H04L 29/08* | (2006.01) |
| *G06F 3/14* | (2006.01) |
| *H04L 67/141* | (2022.01) |
| *H04L 67/146* | (2022.01) |
| *H04L 67/563* | (2022.01) |
| *H04L 67/143* | (2022.01) |

(52) U.S. Cl.
CPC ........ *H04L 12/1822* (2013.01); *G06F 3/1454* (2013.01); *G06F 16/9566* (2019.01); *H04L 67/141* (2013.01); *H04L 67/143* (2013.01); *H04L 67/146* (2013.01); *H04L 67/2814* (2013.01)

(58) Field of Classification Search
CPC . H04L 12/1822; H04L 12/1813; H04L 12/18; H04L 12/16; H04L 29/12943; H04L 67/141; H04L 67/143; H04L 67/146; H04L 67/2814; G06F 16/9566; G06F 16/955; G06F 3/1454; G09G 2370/022
See application file for complete search history.

(56) References Cited

U.S. PATENT DOCUMENTS 6,317,777 B1 * 11/2001 Skarbo ................... G06Q 10/10
  709/204
7,328,258 B2 * 2/2008 Koide ..................... H04L 29/06
  709/203

(Continued)

FOREIGN PATENT DOCUMENTS

| JP | 2016-027443 | 2/2016 |
|---|---|---|
| JP | 2016-515739 | 5/2016 |

(Continued)

*Primary Examiner* — Patrice L Winder
(74) *Attorney, Agent, or Firm* — IPUSA, PLLC

(57) ABSTRACT

An information processing system includes circuitry to: in response to an input of first address information for starting use of an electronic meeting service to one or more terminal apparatuses, acquire one or more pieces of second address information of personal contents to be used respectively by the one or more terminal apparatuses in the electronic meeting service; and redirect each of the one or more terminal apparatuses, to which the first address information is input, a respective destination identified by each of the one or more pieces of second address information.

9 Claims, 18 Drawing Sheets

(56) References Cited

U.S. PATENT DOCUMENTS

| | | | | |
|---|---|---|---|---|
| 7,474,634 | B1* | 1/2009 | Webster | H04L 12/1822 370/261 |
| 8,412,773 | B1* | 4/2013 | Chapweske | H04L 65/608 709/205 |
| 8,498,994 | B2* | 7/2013 | Prabaker | G06F 17/00 707/749 |
| 8,855,285 | B1* | 10/2014 | Bracken | H04M 3/42119 379/202.01 |
| 8,955,048 | B2* | 2/2015 | Uchida | G06F 16/90 726/3 |
| 9,165,290 | B2* | 10/2015 | Wessling | G06Q 10/109 |
| 9,398,059 | B2* | 7/2016 | Shepherd | H04L 65/403 |
| 9,449,303 | B2* | 9/2016 | Underhill | G06Q 10/10 |
| 9,910,644 | B2* | 3/2018 | Chang | G06F 8/38 |
| 10,091,260 | B2* | 10/2018 | Sanso | H04L 65/403 |
| 2002/0113773 | A1* | 8/2002 | McDonnell | H04L 67/18 345/156 |
| 2005/0154784 | A1* | 7/2005 | Malcolm | H04L 69/329 709/213 |
| 2006/0080664 | A1* | 4/2006 | Jawahar | G06F 11/3495 718/100 |
| 2008/0229327 | A1 | 9/2008 | Yoshida | |
| 2009/0100061 | A1 | 4/2009 | Yoshida | |
| 2009/0181659 | A1* | 7/2009 | Stalnacke | H04L 12/66 455/416 |
| 2009/0228487 | A1 | 9/2009 | Yoshida | |
| 2010/0037151 | A1* | 2/2010 | Ackerman | H04L 65/4015 715/753 |
| 2011/0099006 | A1* | 4/2011 | Sundararaman | H04L 12/1831 704/208 |
| 2011/0099153 | A1* | 4/2011 | Barraclough | G06Q 10/109 707/691 |
| 2011/0264745 | A1* | 10/2011 | Ferlitsch | H04L 12/1827 709/205 |
| 2012/0079399 | A1* | 3/2012 | Ferman | G06Q 10/109 715/753 |
| 2013/0067037 | A1 | 3/2013 | Yoshida et al. | |
| 2013/0139270 | A1 | 5/2013 | Yoshida | |
| 2013/0179675 | A1 | 7/2013 | Yoshida | |
| 2014/0223132 | A1 | 8/2014 | Yoshida | |
| 2015/0079959 | A1* | 3/2015 | Daudelin | H04L 12/1827 455/416 |
| 2015/0178260 | A1* | 6/2015 | Brunson | G06F 40/169 715/202 |
| 2015/0331557 | A1* | 11/2015 | Fish | G06F 3/0482 715/773 |
| 2015/0373063 | A1* | 12/2015 | Vashishtha | H04L 65/403 348/14.07 |
| 2015/0378995 | A1* | 12/2015 | Brown | H04L 12/1827 707/608 |
| 2016/0134919 | A1 | 5/2016 | Yoshida et al. | |
| 2017/0264441 | A1 | 9/2017 | Namiki et al. | |
| 2017/0264442 | A1 | 9/2017 | Namiki et al. | |
| 2018/0145840 | A1* | 5/2018 | Advani | H04L 51/32 |
| 2018/0241841 | A1 | 8/2018 | Okuyama et al. | |
| 2018/0335998 | A1* | 11/2018 | Callaghan | G06Q 10/10 |

FOREIGN PATENT DOCUMENTS

| | | |
|---|---|---|
| JP | 2017-084322 | 5/2017 |
| WO | WO2014/165391 A1 | 10/2014 |

* cited by examiner

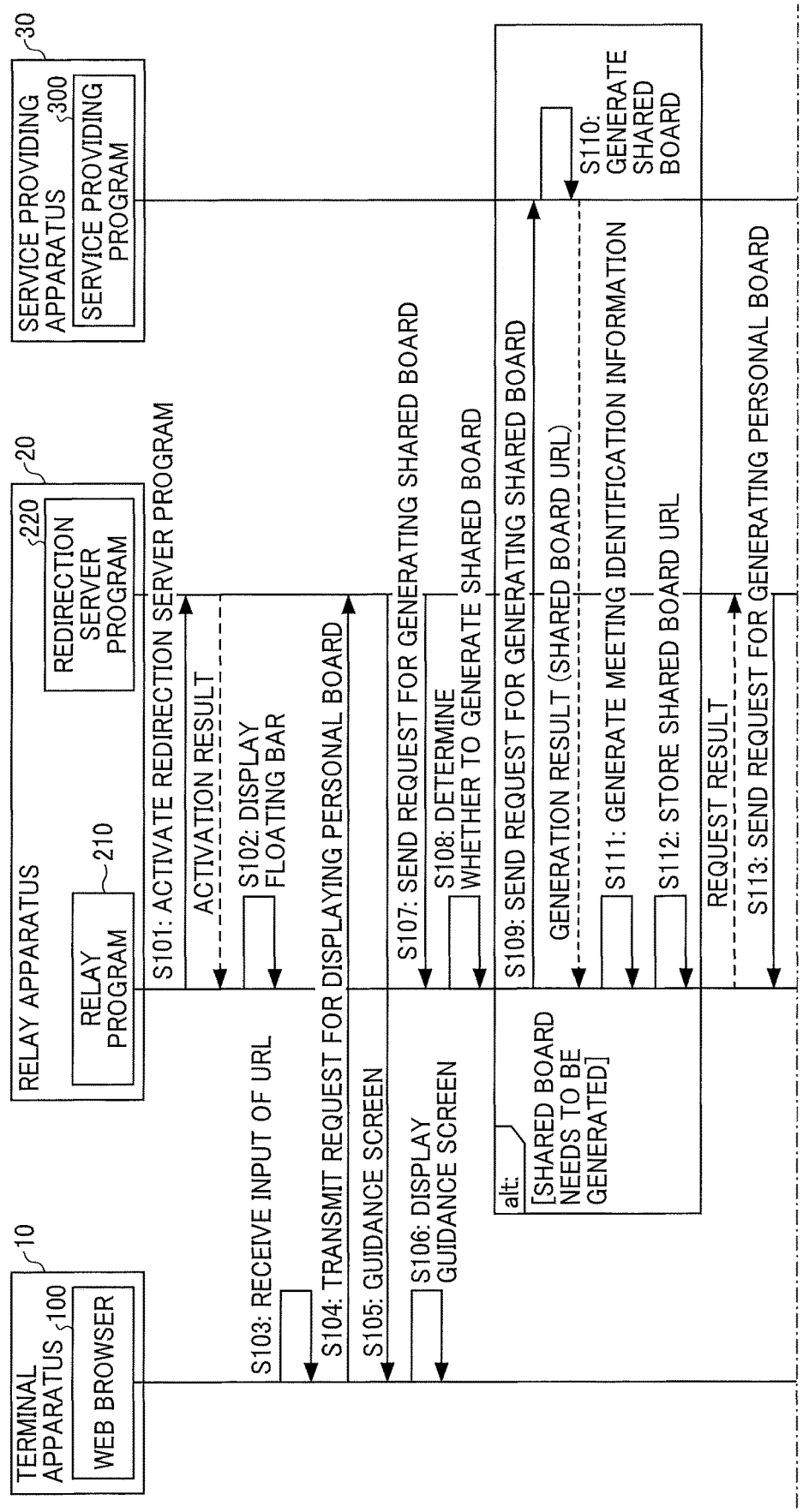

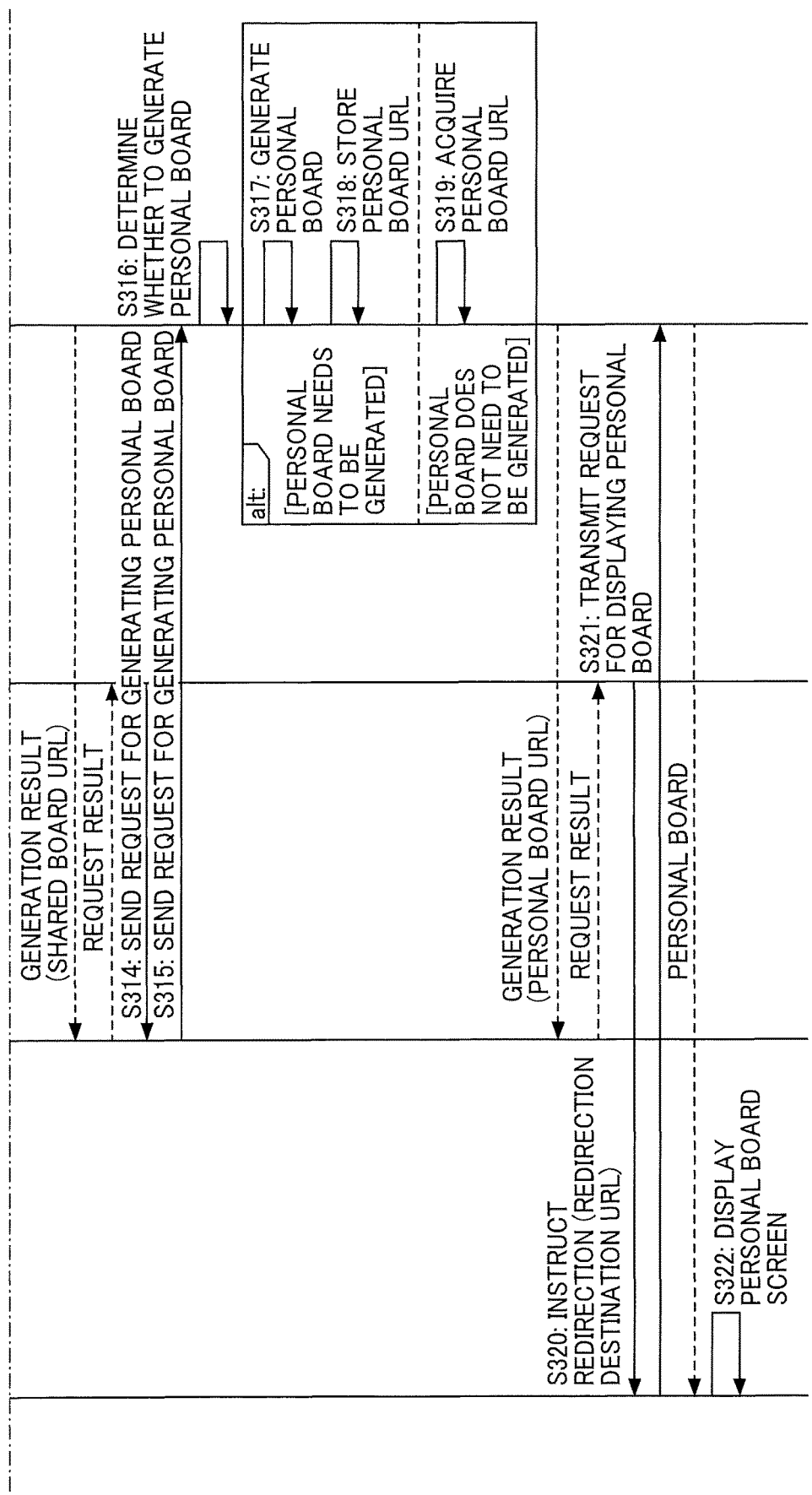

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority under 35 U.S.C. § 119(a) to Japanese Patent Application Nos. 2018-116517, filed on Jun. 19, 2018, and 2019-094703, filed on May 20, 2019, the entire disclosures of which are incorporated herein by reference.

BACKGROUND

Technical Field

The present disclosure relates to an information processing system, an information processing apparatus, and an information processing method.

Description of the Related Art

Electronic meeting systems are known that allow a plurality of terminal devices to perform an electronic meeting via a communication network. Some of such electronic meeting systems can store contents to be shared and used by participants and contents to be used individually by each participant on a server.

In addition, a technology is known that allows contents being displayed by a specific terminal device to be shared and displayed by a plurality of other terminal devices.

Examples of the contents (hereinafter, also referred to as "personal contents") to be used individually by each participants include a virtual whiteboard that is used for taking notes relating to the electronic meeting or the like.

SUMMARY

Embodiments of the present disclosure describes an information processing system including circuitry to: in response to an input of first address information for starting use of an electronic meeting service to one or more terminal apparatuses, acquire one or more pieces of second address information of personal contents to be used respectively by the one or more terminal apparatuses in the electronic meeting service; and redirect each of the one or more terminal apparatuses, to which the first address information is input, a respective destination identified by each of the one or more pieces of second address information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 6A and 6B are a sequence diagram illustrating steps in an operation of starting a meeting, according to the first embodiment of the present disclosure;

FIGS. 13A and 13B are a sequence diagram illustrating steps in an operation of starting a meeting, according to the second embodiment of the present disclosure;

Figure 1:
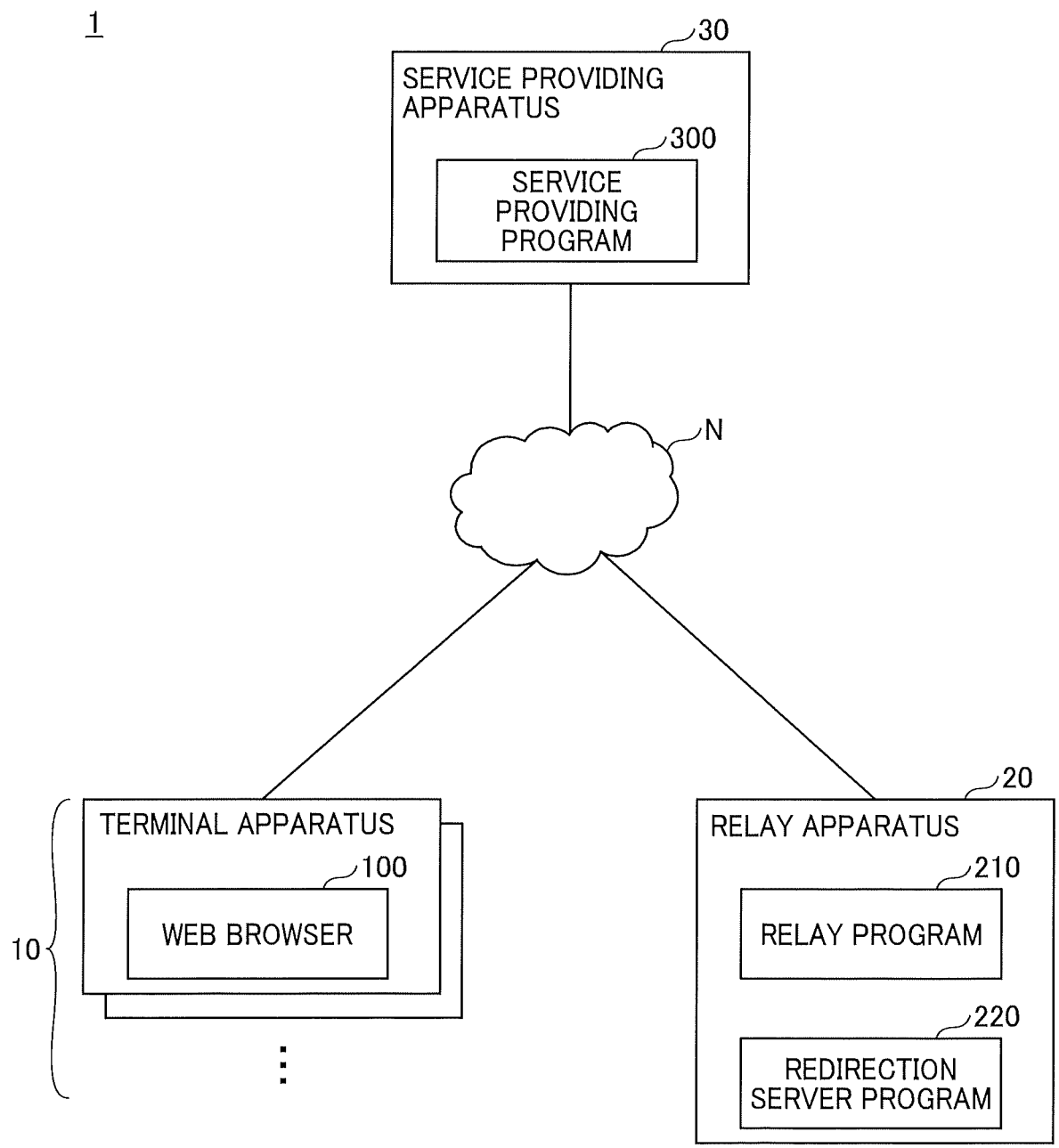
FIG. 1 is a diagram illustrating an example of an overall configuration of a meeting service system, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF THE DRAWINGS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Embodiments of the present disclosure are described below with reference to the drawings. In each of the embodiments described below, a meeting service system 1 is described that implements an electronic meeting service that allows each participant participating in an electronic meeting accesses his/her personal content in a simple manner. In the following, a description is given of an example in which the personal content is a virtual whiteboard (hereinafter referred to as a "personal board") used for taking notes or the like about contents relating to the electronic meeting. The personal board is one example of the personal content. The personal content can be any content to be used individually by each participant participating in an electronic meeting. Examples of the content to be used individually by each participant participating in an electronic meeting include any desired data such as audio data, image data, and document data.

First Embodiment

<Overview of System Configuration>

First, a description is given of a meeting service system 1 according to the present embodiment with reference to FIG. 1. FIG. 1 is a diagram illustrating an example of an overall configuration of the meeting service system 1, according to the first embodiment.

As illustrated in FIG. 1, the meeting service system 1 according to the present embodiment includes a plurality of terminal apparatuses 10, one or more relay apparatuses 20, and a service providing apparatus 30. The terminal apparatus 10, the relay apparatus 20, and the service providing apparatus 30 are communicably connected with one another via a communication network N such as the Internet. In another example, the communication network N can be a local communication network such as an intracompany network.

The terminal apparatus 10 is implemented by, for example, a personal computer (PC) used by a participant participating in an electronic meeting. A web browser 100 is installed on the terminal apparatus 10. The user of the terminal apparatus 10 uses the web browser 100 to use the electronic meeting service (hereinafter, also simply referred to as "meeting service") provided by the service providing apparatus 30.

When using the meeting service, the user can use a personal board generated by the service providing apparatus 30 on the web browser 100. By using the personal board, the user of the terminal apparatus 10 can take notes relating to the meeting on the personal board.

Further, the user can also use a shared board generated by the service providing apparatus 30 on the web browser 100. The shared board is a virtual whiteboard used by all participants participating in the electronic meeting. For example, shared materials that can be viewed by all participants participating in the electronic meeting are displayed on the shared board. The shared board is an example of a content to be shared among participants (i.e., "shared content").

In alternative to the PC, any suitable device can be used as the terminal apparatus 10, such as a smartphone, a tablet terminal, an electronic whiteboard apparatus, a game device, on which the web browser 100 is installed. In the following description, when each of the plurality of terminal apparatuses 10 needs to be distinguished from one another, each of the plurality of the terminal apparatuses 10 is referred to as a "terminal apparatus 10A", "terminal apparatus 10B" . . . .

The relay apparatus 20 is a computer or a computer system that relays communication between the terminal apparatus 10 and the service providing apparatus 30 at the time of starting use of the meeting service, for example. The relay apparatus 20 is located, for example, in a desired room or space such as an actual meeting room. The relay apparatus 20 displays a uniform resource locator (URL) (in particular, a URL having a short and simple expression) for starting use of the meeting service. The terminal apparatus 10 can start using the meeting service by entering the URL into the web browser 100. One relay apparatus 20 can be provided for one service providing apparatus 30. However, in general, a plurality of relay apparatuses 20 are provided.

A relay program 210 and a redirection server program 220 are included (installed) in the relay apparatus 20.

For example, when the terminal apparatus 10 starts using the meeting service, the relay apparatus 20 executes the relay program 210 to request the service providing apparatus 30 to generate a personal board to be used by a user of the terminal apparatus 10. Further, the relay apparatus 20 executes the redirection server program 220 to redirect the terminal apparatus 10 to the personal board generated by the service providing apparatus 30. As a result, the personal board is displayed on the web browser 100 of the terminal apparatus 10. As described above, a user of the terminal apparatus 10 only needs to enter a URL displayed on the relay apparatus 20 (in particular, a URL having a short and simple expression) on the web browser 100 to access the personal board to be used in the meeting service. In the embodiment, the term "redirect" or "redirection" refers to automatically forward to another connection destination. Further, the term "redirect" or "redirection" indicates not only forwarding to a specific other web page in response to receiving an access to a specific URL, but also identifying a web page as a new destination from among a plurality of web pages based on various conditions and forwarding to the identified web page in response to receiving an access to a specific URL.

The relay apparatus 20 is implemented by any suitable device such as a PC, an electronic whiteboard apparatus, a display apparatus, a digital signage apparatus, a projector apparatus, on which the relay program 210 and the redirection server program 220 are installed.

The service providing apparatus 30 is a computer or a computer system that provides the meeting service as a cloud service, for example. A service providing program 300 is included (installed) in the service providing apparatus 30. In response to a request from the relay apparatus 20, the service providing apparatus 30 executes the service providing program 300 to generate a shared board and a personal board.

Further, the service providing apparatus 30 executes the service providing program 300 to perform various processes (for example, synchronization between the terminal apparatuses 10 of the participants participating in a meeting) to implement the meeting service.

The configuration of the meeting service system 1 illustrated in FIG. 1 is just an example, and alternatively other configuration can be used. For example, the meeting service system 1 can include a plurality of service providing apparatuses 30.

<Overview of Access to Personal Board>

Figure 2:
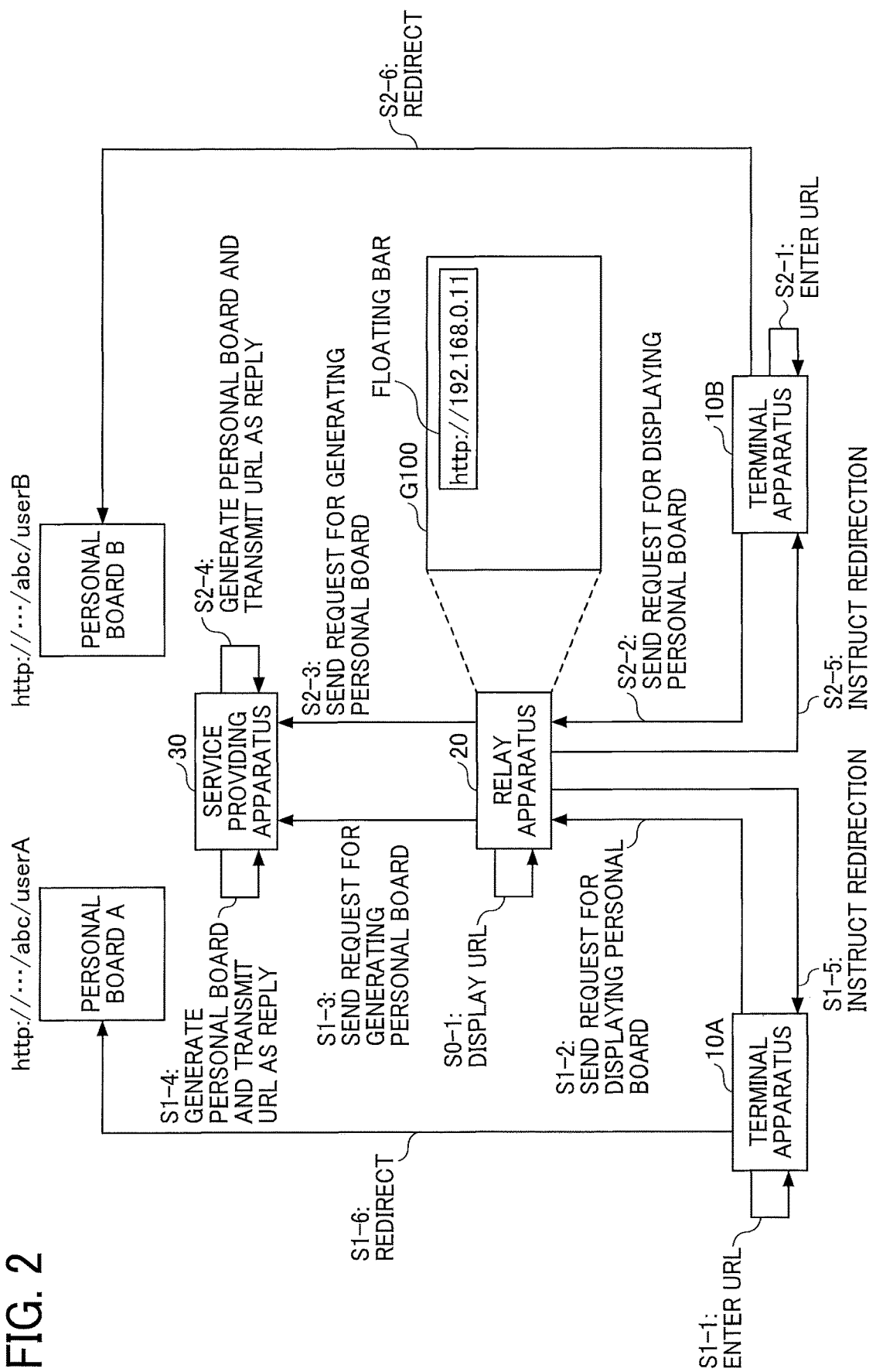
FIG. 2 is an illustration for describing an example of an overview of access to a personal board, according to embodiments of the present disclosure.

Referring to FIG. 2, an example is described in which a user A using the terminal apparatus 10A and a user B using the terminal apparatus 10B use the meeting service and access their personal boards respectively. FIG. 2 is a diagram for describing an example of an overview of access to a personal board. In the following description of FIG. 2, it is assumed that a personal board A used by the user A and a personal board B used by the user B are not generated in advance.

S0-1: The relay apparatus 20 executes the relay program 210 to display a screen G100 including a floating bar. In the embodiment, the floating bar is a display component in which a URL for starting use of the meeting service is displayed. The screen G100 is displayed, for example, when the relay apparatus 20 starts up.

The URL displayed in the floating bar is a URL indicating the relay apparatus 20 (more accurately, a URL indicating a web server implemented by the redirection server program 220 of the relay apparatus 20). The URL displayed in the floating bar is an example of the first address information. It is preferable that this URL has a short and simple expression. In the following description, the URL included in the floating bar is also referred to as a "shortened URL" on the assumption that a URL having a short and simple expression is used. However, the shortened URL is not necessarily required to have short and simple expression. For example, the shortened URL can be a URL that is easy to remember for the user, or easy to enter for the user.

S1-1: The user A of the terminal apparatus 10A enters the shortened URL included in the floating bar into the web browser 100. For example, the user A enters the shortened URL "192.168.0.11" into the web browser 100.

S1-2: The web browser 100 of the terminal apparatus 10A transmits a personal board display request to the shortened URL (i.e., the relay apparatus 20) that is entered in the step S1-1.

S1-3) When the redirection server program 220 receives the personal board display request, the relay apparatus 20 executes the relay program 210 to transmit a personal board generation request to the service providing apparatus 30.

S1-4) In response to receiving the personal board generation request, the service providing apparatus 30 executes the service providing program 300 to generate a personal board A of the user A and transmit an URL for accessing the personal board A to the relay apparatus 20. The URL for accessing the personal board is an example of the second address information. The personal board A is stored in an auxiliary storage device or the like of the service providing apparatus 30.

S1-5) The redirection server program 220 of the relay apparatus 20 sends an instruction for redirecting to the URL for accessing the personal board A to the terminal apparatus 10A.

S1-6) The terminal apparatus 10A redirects to its own personal board A. As a result, the personal board A is displayed on the web browser 100 of the terminal apparatus 10A. Thus, the user A can access his/her personal board A.

S2-1: On the other hand, the user B of the terminal apparatus 10B enters the shortened URL included in the floating bar into the web browser 100. For example, the user B enters the shortened URL "192.168.0.11" into the web browser 100 in substantially the same manner as the user A.

S2-2) The web browser 100 of the terminal apparatus 10B transmits a personal board display request to the shortened URL that is entered in the step S2-1.

S2-3) When the redirection server program 220 receives the personal board display request, the relay apparatus 20 executes the relay program 210 to transmit a personal board generation request to the service providing apparatus 30, in substantially the same manner as step S1-3.

S2-4) In response to receiving the personal board generation request, the service providing apparatus 30 executes the service providing program 300 to generate a personal board B of the user B and transmit an URL for accessing the personal board B to the relay apparatus 20. The personal board B is stored in an auxiliary storage device or the like of the service providing apparatus 30.

S2-5) The redirection server program 220 of the relay apparatus 20 sends an instruction for redirecting to the URL for accessing the personal board B to the terminal apparatus 10B.

S2-6) The terminal apparatus 10B redirects to its own personal board B. As a result, the personal board B is displayed on the web browser 100 of the terminal apparatus 10B. Thus, the user B can access his/her personal board B.

As described above, the user A and the user B enter the shortened URL (for example, "192.168.0.11") displayed on the relay apparatus 20 into the web browser 100 to cause their own personal boards to be generated, and the user A and the user B can easily access the generated personal boards. In other words, the user A and the user B enter the same shortened URL of the short and simple expression into the web browser 100 to cause the personal board to be generated for each of the users, thereby can easily access the personal board. This enables the user A and the user B to conduct an electronic meeting using their own personal boards respectively.

In the above description of FIG. 2, an example is described in which the personal boards of user A and user B are not generated in advance. However, when the personal boards are generated in advance, for example, generation of the personal boards is not performed as described below. In this case, the personal boards are not generated in steps S1-4 and S1-5. Accordingly, in steps S1-6 and S2-6, the terminal apparatus 10A and the terminal apparatus 10B are redirected to the personal boards generated in advance. Therefore, for example, even when the display of the personal board on the web browser 100 is closed in the middle of the electronic meeting, the display of the personal board can be resumed in a simple manner by entering again the shortened URL that is being displayed on the relay apparatus 20 into the web browser 100.

<Hardware Configuration>

Figure 3:
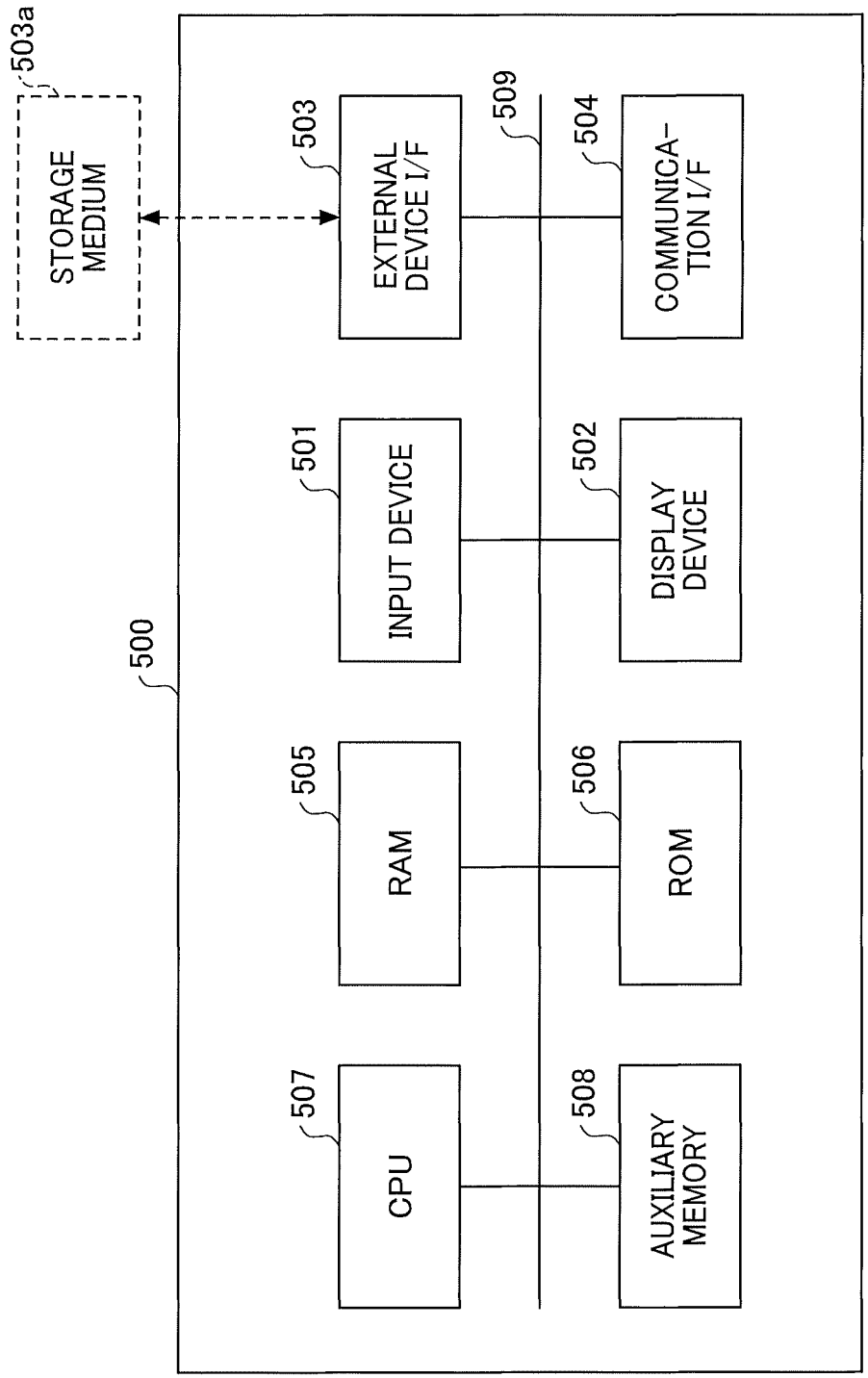
FIG. 3 is a block diagram illustrating an example of a hardware configuration of a computer, according to embodiments of the present disclosure.

Next, hardware configurations of the terminal apparatus 10, the relay apparatus 20 and the service providing apparatus 30 are described according to the embodiment. Each of the terminal apparatus 10, the relay apparatus 20, and the service providing apparatus 30 according to the present embodiment can be implemented, for example, by a computer 500 having a hardware configuration as illustrated in FIG. 3. FIG. 3 is a block diagram illustrating an example of a hardware configuration of the computer 500 according to the present embodiment.

The computer 500 illustrated in FIG. 3 includes, for example, an input device 501, a display device 502, an external device interface (I/F) 503, a communication I/F 504, a random access memory (RAM) 505, a read only memory (ROM) 506, a central processing unit (CPU) 507, and auxiliary memory 508. These hardware components are communicably connected to each other through a bus 509.

The input device 501 includes, for example, a keyboard, a mouse, and a touch panel, and is used by the user to input various operations. The display device 502 is, for example, a display, and displays processing results by the computer 500. At least one of the input device 501 and the display device 502 can be omitted in the service providing apparatus 30.

The external device I/F 503 is an interface that connects the computer 500 to an external device. Examples of the external device include a storage medium 503a. The external device I/F 503 allows the computer 500 to read or write data from or to the storage medium 503a. Examples of the storage medium 503a include a secure digital (SD) memory card, a universal serial bus (USB) memory, a compact disc (CD), and a digital versatile disc (DVD).

The communication I/F 504 is an interface that connects the computer 500 to the communication network N. The RAM 505 is a volatile semiconductor memory, which temporarily holds programs and data. The ROM 506 is a nonvolatile semiconductor memory, which holds programs or data even after the computer 500 is turned off as the power is not supplied.

The CPU 507 reads programs or data from a storage device such as the ROM 506 or the auxiliary memory 508 onto the RAM 505, and executes processing according to the read-out program or data, to control entire operation of the computer 500 or implement functions of the computer 500.

The auxiliary memory 508 is a nonvolatile storage device that stores programs and data, such as a hard disc drive (HDD) or a solid state drive (SSD). Examples of the programs or data stored in the auxiliary memory 508 include an operating system (OS) for controlling entire operation of the computer 500 and application software providing various functions on the OS. The auxiliary memory 508 of the terminal apparatus 10 stores the web browser 100. The auxiliary memory 508 of the relay apparatus 20 stores the relay program 210 and the redirection server program 220. The auxiliary memory 508 of the service providing apparatus 30 stores the service providing program 300.

The terminal apparatus 10, the relay apparatus 20, and the service providing apparatus 30 according to the present embodiment can implement various processes according to the present embodiment with the hardware configuration of the computer 500 illustrated in FIG. 3. Each of the terminal apparatus 10, the relay apparatus 20, and the service providing apparatus 30 according to the present embodiment can be implemented by a plurality of computers 500 each having the hardware configuration as described.

<Functional Configuration>

Figure 4:
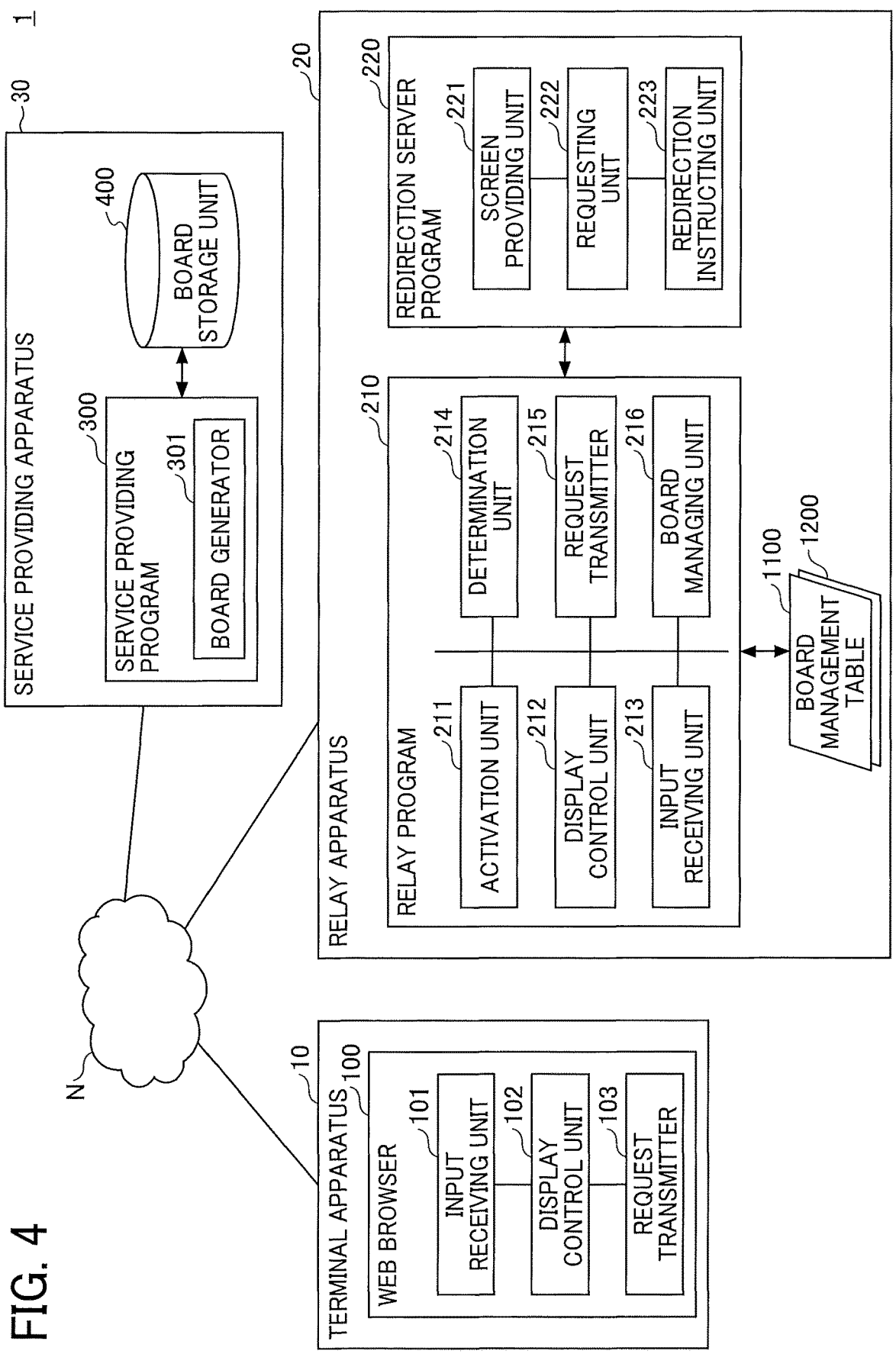
FIG. 4 is a diagram illustrating an example of a functional configuration of the meeting service system, according to the first embodiment of the present disclosure.

Next, referring to FIG. 4, a functional configuration of the meeting service system 1 is described according to the present embodiment. FIG. 4 is a diagram illustrating an example of a functional configuration of the meeting service system 1, according to the first embodiment.

<<Terminal Apparatus 10>>

As illustrated in FIG. 4, the terminal apparatus 10 according to the present embodiment includes an input receiving unit 101, a display control unit 102, and a request transmitter 103. These functional units are implemented by processes that the web browser 100 causes the CPU 507 to execute. Specifically, a part of or the entirety of processes executed by these functional units is implemented by the CPU 507 being caused to execute processing relating to a web content by the web browser 100. The web content is various data acquired from a web server (or a program that functions as a web server). Examples of the web content include HTML (Hyper Text Markup Language), Cascading Style Sheets (CSS), and JavaScript (registered trademark).

The input receiving unit 101 receives various inputs, such as input of a URL, from a user. The display control unit 102 displays various screens such as a screens including the personal board (hereinafter may be referred to as "personal board screen"). The request transmitter 103 transmits various requests such as the personal board display request.

<<Relay Apparatus 20>>

As illustrated in FIG. 4, the relay apparatus 20 according to the present embodiment includes an activation unit 211, a display control unit 212, an input receiving unit 213, a determination unit 214, a request transmitter 215, and a board management unit 216. These functional units are implemented by processes that the relay program 210 causes the CPU 507 to execute.

The relay apparatus 20 according to the present embodiment further includes a screen providing unit 221, a requesting unit 222, and a redirection instructing unit 223. These functional units are implemented by processes that the redirection server program 220 causes the CPU 507 to execute.

The activation unit 211 activates the redirection server program 220, in response to startup of the relay apparatus 20, for example.

The display control unit 212 displays various screens such as a screen including the floating bar. The input receiving unit 213 receives various inputs, such as pressing of a meeting end button described later, from a user.

The determination unit 214 determines whether the shared board needs to be generated, referring to a board management table 1100. Further, the determination unit 214 determines whether the personal board of a target user (a user who is a participant participating in the electronic meeting) needs to be generated, referring to a board management table 1200.

Figure 5A:
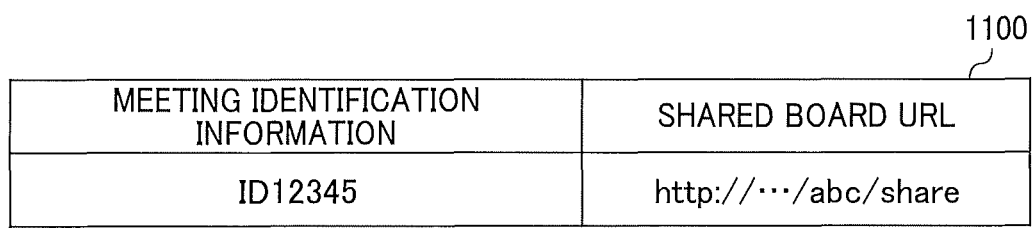
FIGS. 5A and 5B are diagrams each illustrating an example of a board management table, according to embodiments of the present disclosure.
Figure 5B:
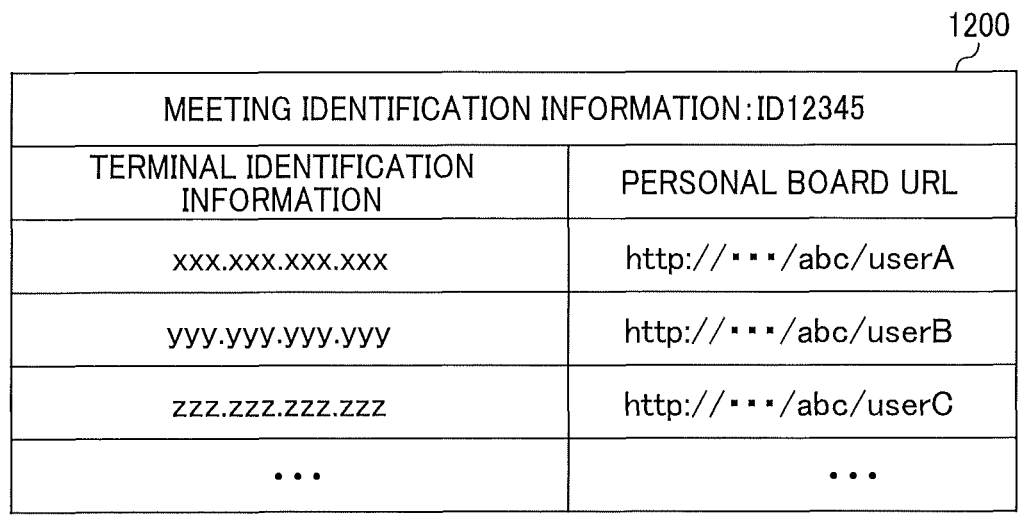

The board management table 1100 and the board management table 1200 are tables for managing the URLs of the shared board and the personal board, respectively. These tables are stored, for example, in the auxiliary memory 508. Referring to FIGS. 5A and 5B, the board management table 1100 and the board management table 1200 are described. FIG. 5A is a diagram illustrating an example of the board management table 1100. FIG. 5B is a diagram illustrating an example of the board management table 1200.

As illustrated in FIG. 5A, the board management table 1100 includes meeting identification information and a shared board URL. The meeting identification information is information for identifying an electronic meeting. As described below, the meeting identification information is generated when the shared board is generated. The shared board URL is a URL for accessing the shared board.

Thus, when a shared board is generated, the meeting identification information and an URL for accessing the generated shared board are stored in association with each other in the board management table 1100.

Further, as illustrated in FIG. 5B, the board management table 1200 includes meeting identification information, terminal identification information, and a personal board URL. The meeting identification information is information for identifying an electronic meeting. The terminal identification information is information for identifying the terminal apparatus 10. Examples of the terminal identification information include an IP (Internet protocol) address of the terminal apparatus 10. In alternative to the IP address, the terminal identification information can be any desired information that can identify the terminal apparatus 10, such as a manufacturing number unique to the terminal apparatus 10.

The personal board URL is a URL for accessing the personal board to be used by a user of the terminal apparatus 10 identified by the associated terminal identification information.

Thus, when a personal board is generated in response to the personal board generation request from the terminal apparatus 10, the meeting identification information, the terminal identification information of the terminal apparatus 10, and an URL for accessing the generated personal board are stored in association with one another in the board management table 1200.

Therefore, the determination unit 214 refers to the board management table 1100 and determines that the shared board needs not to be generated based on determination that the shared board URL is already stored in the board management table 1100, for example. In substantially the same manner, the determination unit 214 refers to the board management table 1200 and determines that the personal board of the target user needs not to be generated based on determination that the terminal identification information identifying the terminal apparatus 10 of the target user and the personal board URL are already stored in the board management table 1200.

The request transmitter 215 transmits various requests such as a shared board generation request or the personal board generation request.

The board management unit 216 manages the board management table 1100 and the board management table 1200. In other words, the board management unit 216 updates the board management table 1100 and the board management table 1200 in response to generation of the shared board and the personal board by the service providing apparatus 30.

The screen providing unit 221 provides the terminal apparatus 10 with various screens such as a guidance screen described later. The requesting unit 222 sends a request for generating the shared board or the personal board to the relay program 210 in response to a request from the terminal apparatus 10. The redirection instructing unit 223 transmits an instruction for redirection to the personal board screen to the terminal apparatus 10.

<<Service Providing Apparatus 30>>

As illustrated in FIG. 4, the service providing apparatus 30 according to the present embodiment includes a board generator 301. The board generator 301 is implemented by a process that the service providing program 300 causes the CPU 507 to execute.

The service providing apparatus 30 according to the present embodiment further includes a board storage unit 400. The board storage unit 400 is implemented by, for example, the auxiliary memory 508. In another example, the board storage unit 400 is implemented by, for example, a storage device that is communicably connected to the service providing apparatus 30 through the communication network N.

The board generator 301 generates the shared board or the personal board in response to a request from the relay apparatus 20. Further, the board generator 301 stores the generated shared board and personal board in the board storage unit 400.

<Details of Operation>

Next, an operation performed by the meeting service system 1 is described in detail according to the present embodiment.

<<Meeting Start Process>>

Figure 6B:
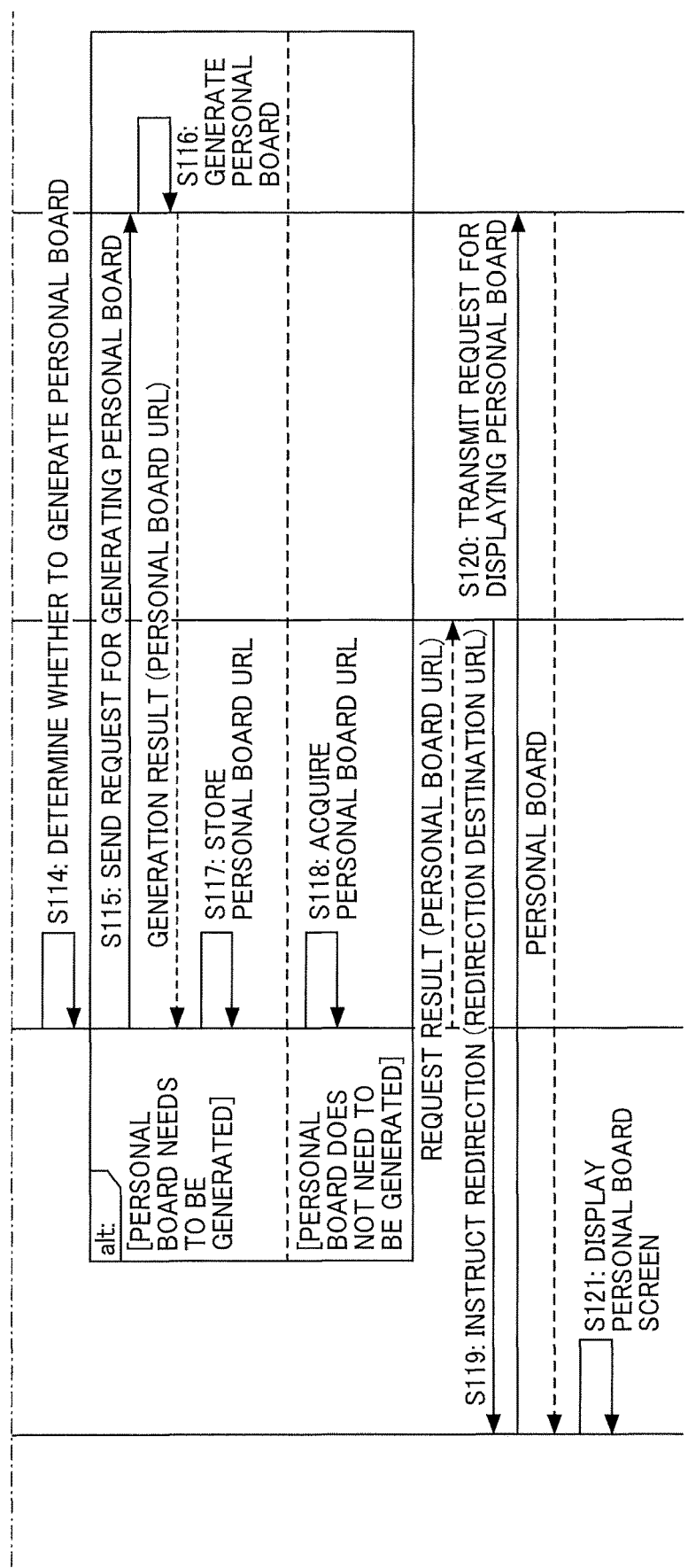

A description is given hereinafter of an example of an operation performed by the meeting service system 1 according to the present embodiment when starting an electronic meeting, with reference to FIGS. 6A and 6B. FIGS. 6A and 6B are a sequence diagram illustrating steps in an operation of starting a meeting, according to the first embodiment.

First, the activation unit 211 of the relay program 210 activates the redirection server program 220, in response to a startup of the relay apparatus 20, for example (step S101). When the redirection server program 220 is activated, the relay apparatus 20 is caused to function as a web server by the redirection server program 220. The redirection server program 220 transmits the activation result to the relay program 210.

Figure 7:
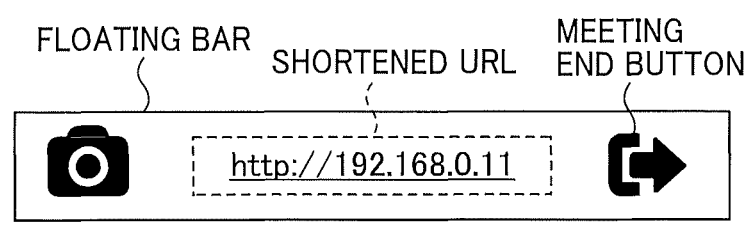
FIG. 7 is a diagram illustrating an example of a floating bar, according to embodiments of the present disclosure.

Next, the display control unit 212 of the relay program 210 displays the floating bar including the shortened URL on the screen (step S102). As a result, the shortened URL for starting the use of the electronic meeting is displayed on the relay apparatus 20. FIG. 7 is a diagram illustrating an example of the floating bar. As illustrated in FIG. 7, the shortened URL for starting the use the electronic meeting is displayed in the floating bar. The floating bar further displays a meeting end button for terminating the use of the electronic meeting. As described below, a user presses the meeting end button to end the use of the electronic meeting.

Although in the present embodiment, a description is given of an example in which the shortened URL is displayed on the screen of the relay apparatus 20, this is just one example. In another example, a QR code (registered trademark) or the like representing a shortened URL can be displayed on the screen of the relay apparatus 20. In still another example, on the screen of the relay apparatus 20, an image transmitted from the terminal apparatus 10 can be displayed as a shared screen in addition to the floating bar illustrated in FIG. 7. In still another example, the shared board can be displayed on the screen of the relay apparatus 20, in addition to the floating bar. When the shared board is displayed in addition to the floating bar on the screen of the relay apparatus 20, the shared board can also receive an operation such as an input of handwriting, an input of characters, or pasting of an image from each terminal apparatus 10 or can receive an operation in the relay apparatus 20.

Further, displaying the shortened URL on the screen is just one example. In another example, a sticker or the like on which the shortened URL is printed can be placed on the housing of the relay apparatus 20.

For example, the user of the terminal apparatus 10 enters the shortened URL in an address bar of the web browser 100. The input receiving unit 101 of the web browser 100 receives the input of the shortened URL (step S103).

In an example case in which a plurality of relay apparatuses 20 are respectively located in a plurality of rooms or spaces, the plurality of relay apparatuses 20 respectively display different shortened URLs. In this case, when the shortened URL displayed by each of the plurality of relay apparatuses 20 is fixed, the shorted URL can be entered even from outside the room or space in which the relay apparatus 20 is located. To address this issue, when the shortened URL is input in step S103, an input of a pass code or the like that varies for each electronic meeting can be requested. In another example, the shortened URL displayed in step S102 can include a random number.

Next, the request transmitter 103 of the web browser 100 transmits a personal board display request to the relay apparatus 20 (step S104). Specifically, the request transmitter 103 transmits the personal board display request to the shortened URL, to transmit the personal board display request to the relay apparatus 20.

In response to receiving the personal board display request, the screen providing unit 221 of the redirection server program 220 transmits a guidance screen (more accurately, a web content for displaying the guidance screen) to the terminal apparatus 10 (step S105).

Figure 8:
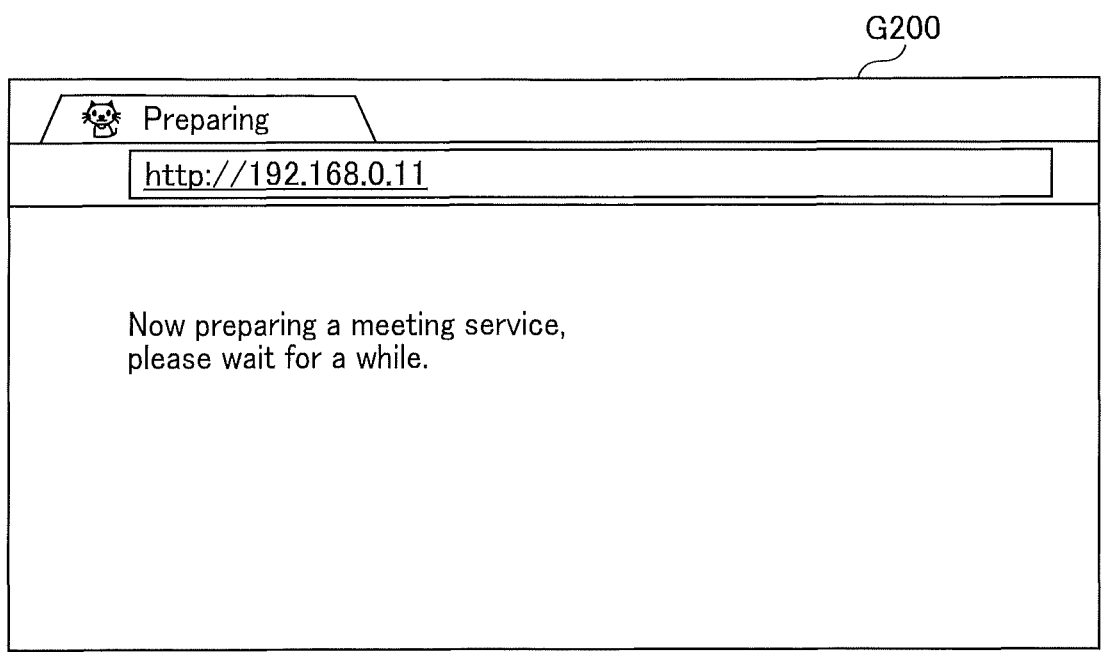
FIG. 8 is an illustration of an example of a guidance screen, according to embodiments of the present disclosure.

In response to receiving the guidance screen, the display control unit 102 of the web browser 100 displays a guidance screen G200 as illustrated in FIG. 8 (step S106). FIG. 8 is an illustration of an example of the guidance screen G200, which is displayed on the terminal apparatus 10 until the electronic meeting is started. The reason why the guidance screen G200 is displayed is that it takes a certain time to generate the personal board. In another example in which it takes little time to prepare the personal board, the step of displaying the guidance screen G200 on the terminal apparatus 10 can be omitted.

However, in still another example, the guide screen G200 can be displayed on the terminal apparatus 10 for a predetermined time in every case. This improves security against an attack such as finding the personal board URL by brute-force attack or the like.

The requesting unit 222 of the redirection server program 220 transmits a shared board generation request to the relay program 210 (step S107).

The determination unit 214 of the relay program 210 determines whether a shared board needs to be generated, referring to the board management table 1100 (step S108). Specifically, when the shared board URL is stored in the board management table 1100, the determination unit 214 determines that generation of the shared board is not necessary. By contrast, when no shared board URL is stored in the board management table 1100, the determination unit 214 determines that generation of the shared board is necessary.

When the determination unit 214 determines in step S108 that the shared board needs to be generated, the request transmitter 215 of the relay program 210 transmits a shared board generation request to the service providing apparatus 30 (step S109).

In response to receiving the shared board generation request, the board generator 301 of the service providing program 300 generates a shared board (step S110). Next, the board generator 301 transmits a shared board URL to the relay apparatus 20 as a response. The generated shared board is stored in the board storage unit 400.

The board management unit 216 of the relay program 210 generates meeting identification information (step S111). Next, the board management unit 216 of the relay program 210 stores the meeting identification information generated in step S111 in association with the shared board URL transmitted from the service providing apparatus 30 in the board management table 1100 (step S112).

Subsequently, the relay program 210 sends a request result in response to the shared board generation request to the redirection server program 220. The request result is, for example, information indicating that a shared board is generated, when the shared board is generated in step S110 based on the determination in step S108. By contrast, the request result is information indicating that no shared board is generated, when the determination unit 214 determines in step S108 that the shared board needs not to be generated.

In short, when use of an electronic meeting is started in a state where a shared board is not generated in advance, the shared board is generated. Although in the present embodiment, an example case is described in which the shared board is generated after the shortened URL is entered to the web browser 100 of the terminal apparatus 10, the shared board can be generated at any suitable timing other than after the input of the shortened URL. For example, the shared board can be generated after the relay apparatus 20 is activated. In still another example, after the previous electronic meeting ends, a shared board for the next electronic meeting can be generated.

Next, the requesting unit 222 of the redirection server program 220 transmits a personal board generation request to the relay program 210 (step S113).

The determination unit 214 of the relay program 210 determines whether a personal board needs to be generated, referring to the board management table 1200 (step S114). In other words, the determination unit 214 determines that a personal board needs not to be generated based on determination that the terminal identification information identifying the terminal apparatus 10 as a request source of the personal board display request received at step S104 and a personal board URL are already stored in the board management table 1200. By contrast, when such terminal identification information and the personal board URL are not stored in the board management table 1200, the determination unit 214 determines that the personal board needs to be generated. The terminal identification information is, for example, an IP address of the terminal apparatus 10, as described above.

When the determination unit 214 determines in step S114 that a personal board needs to be generated, the request transmitter 215 of the relay program 210 transmits a personal board generation request to the service providing apparatus 30 (step S115).

In response to receiving the personal board generation request, the board generator 301 of the service providing program 300 generates a personal board of the user of the terminal apparatus 10 as a request source of the personal board display request (step S116). Further, the board generator 301 transmits a personal board URL to the relay apparatus 20. The generated personal board is stored in the board storage unit 400.

The board management unit 216 of the relay program 210 stores the meeting identification information, the terminal identification information identifying the terminal apparatus 10 as a request source of the personal board display request, and the personal board URL transmitted from the service providing apparatus 30 in association with each other in the board management table 1200 (step S117). This meeting identification information is meeting identification information associated with the shared board URL in the board management table 1100.

By contrast, when the determination unit 214 determines in step S114 that a personal board needs not to be generated, the board management unit 216 of the relay program 210 acquires the personal board URL of the user of the terminal apparatus 10 as a request source of the personal board display request from the board management table 1200 (step S118). Specifically, the board management unit 216 acquires, from the board management table 1200, the personal board URL that is associated with the meeting identification information associated with the shared board URL in the board management table 1100 and the terminal identification information identifying the terminal apparatus 10 as a request source of the personal board display request.

Subsequently, the relay program 210 transmits a request result in response to the personal board generation request to the redirection server program 220. This request result includes the personal board URL of the user of the terminal apparatus 10. This personal board URL is a personal board URL transmitted from the service providing apparatus 30 in step S110 or the personal board URL acquired in step S118.

The redirection instructing unit 223 of the redirection server program 220 transmits a redirection instruction that designates the personal board URL as a redirection destination URL to the terminal apparatus 10 (the terminal apparatus 10 as a request source of the personal board display request received in step S104) (step S119).

The request transmitter 103 of the web browser 100 transmits the personal board display request to the redirection destination URL (step S120). In response, the service providing apparatus 30 transmits the personal board (more accurately, a web content for displaying the personal board) to the terminal apparatus 10.

Figure 9:
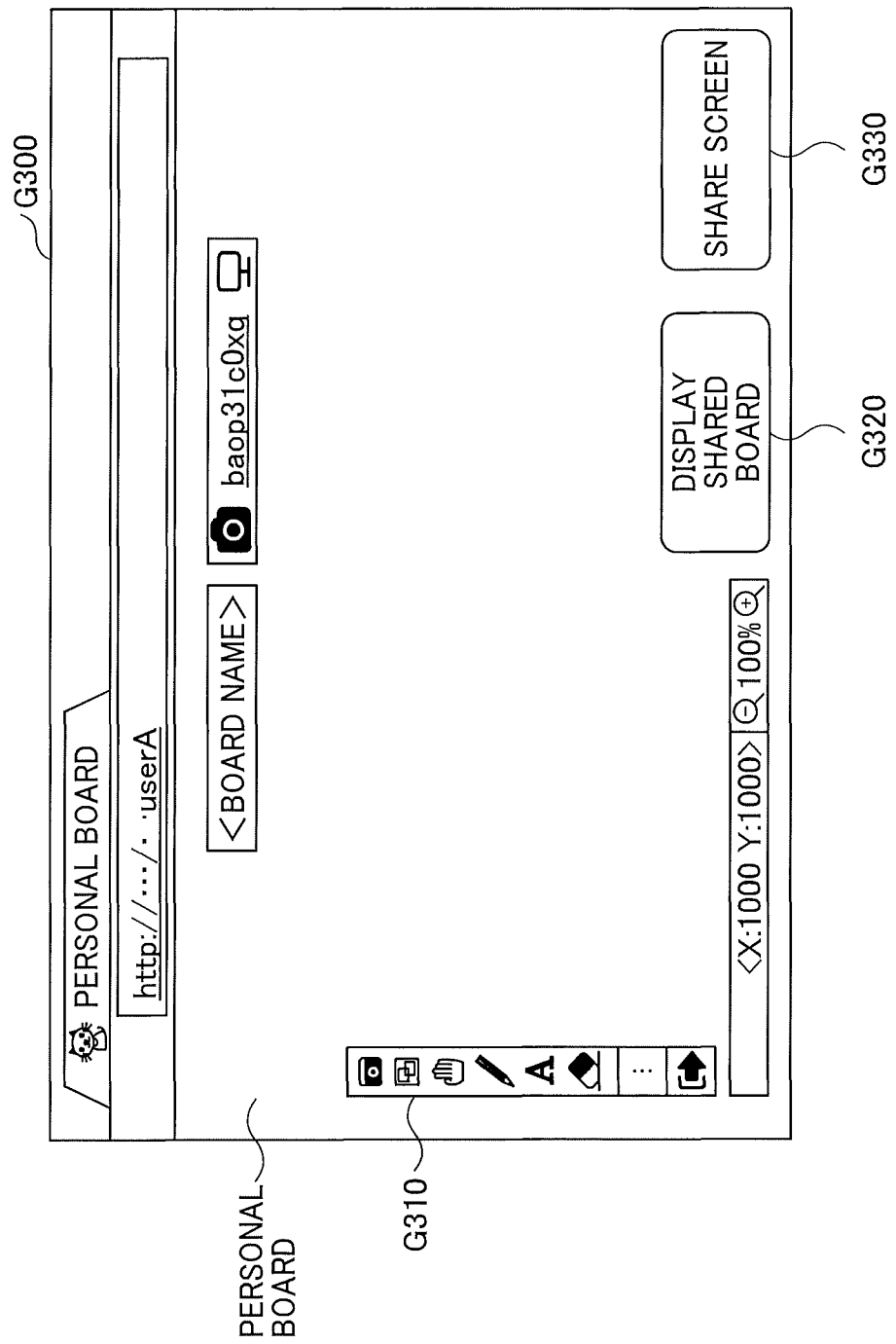
FIG. 9 is an illustration of an example of a personal board screen, according to embodiments of the present disclosure.

In response to receiving the personal board, the display control unit 102 of the web browser 100 displays a personal board screen G300, of which example is illustrated in FIG. 9 (step S121). On the personal board screen G300 illustrated in FIG. 9, the personal board is displayed. This allows the user of the terminal apparatus 10 to conduct an electronic meeting using the personal board.

The personal board screen G300 illustrated in FIG. 9 includes a drawing tool selection field G310. The user can draw desired characters or figures on the personal board by selecting a desired drawing tool (for example, a pen or character input) from the drawing tool selection field G310. An image or the like also be pasted on the personal board.

The personal board screen G300 illustrated in FIG. 9 further includes a shared board display button G320 and a screen sharing button G330. The user presses the shared board display button G320 to cause the terminal apparatus 10 to display the shared board. Further, the user presses the screen sharing button G330 to cause a screen content being displayed on the terminal apparatus 10 of the user to be shared with the other terminal apparatuses 10.

As described heretofore, in the meeting service system 1 according to the present embodiment, when a user of each terminal apparatus 10 enters a shortened URL into the web browser 100, the connection destination is automatically redirected to the personal board generated for each user. As a result, each user can easily access his or her personal board simply by entering the same shortened URL into the web browser 100.

Further, in the meeting service system 1 according to the present embodiment, when a personal board of a user who enters a shortened URL to the web browser 100 is not generated in advance, a personal board is newly generated, and the connection destination is redirected to the generated personal board of the user. By contrast, when a personal board of a user is already generated, a personal board is not newly generated, and the connection destination is redirected to the already-generated personal board of the user. Therefore, for example, even when the display of a personal board on the web browser 100 is closed in the middle of an electronic meeting, the display of the personal board can be resumed in a simple manner by entering again the shortened URL that is being displayed on the relay apparatus 20 into the web browser 100.

<<Meeting Termination Process>>

Figure 10:
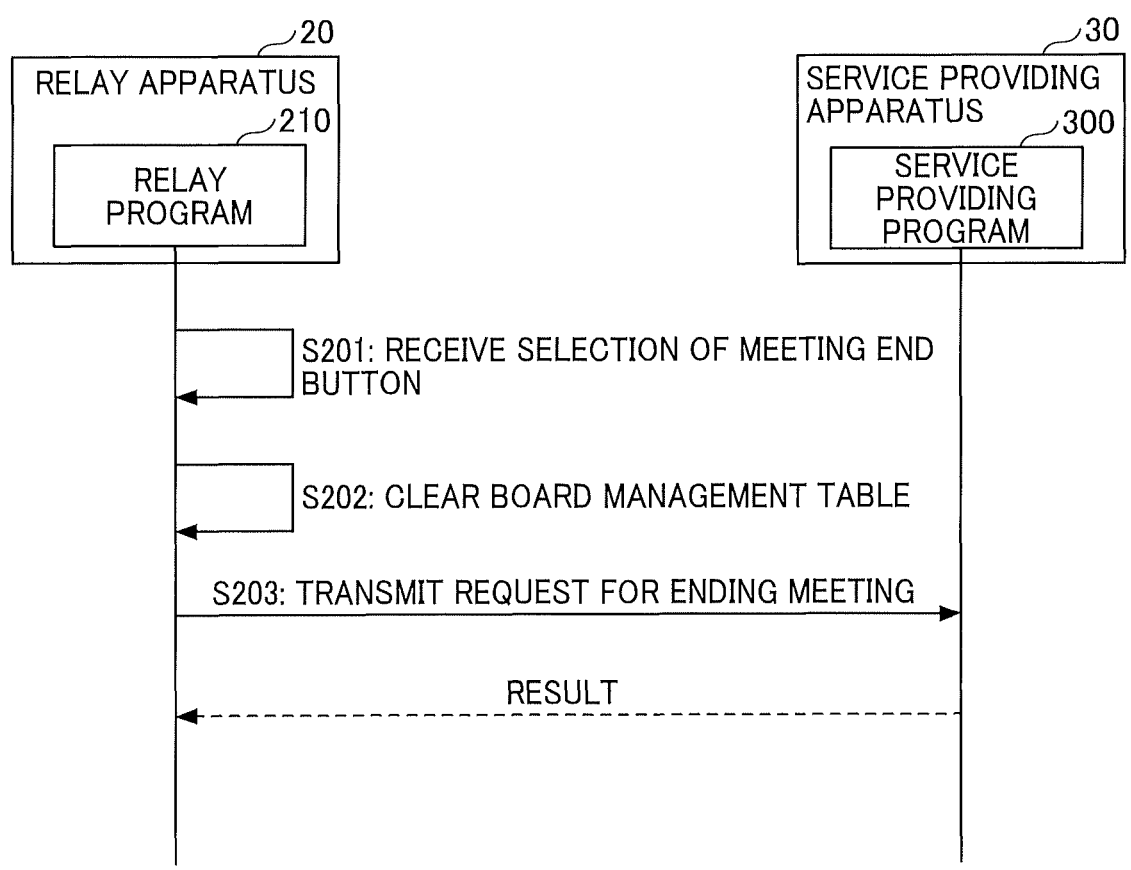
FIG. 10 is a sequence diagram illustrating steps in an operation of terminating a meeting, according to the first embodiment of the present disclosure.

A description is given hereinafter of an example of an operation performed by the meeting service system 1 according to the present embodiment when terminating an electronic meeting, with reference to FIG. 10. FIG. 10 is a sequence diagram illustrating steps in an operation of terminating a meeting, according to the first embodiment.

For example, it is assumed that a participant of an electronic meeting presses (enters) the meeting end button included in the floating bar being displayed on the relay apparatus 20. In response, the input receiving unit 213 of the relay program 210 receives the input of the meeting end button (step S201).

Next, the board management unit 216 of the relay program 210 clears the board management table 1100 and the board management table 1200 (step S202). Specifically, the board management unit 216 deletes the meeting identification information and the shared board URL stored in the board management table 1100. Further, the board management unit 216 deletes the meeting identification information, the terminal identification information, and the personal board URL stored in the board management table 1200.

Next, the request transmitter 215 of the relay program 210 transmits a meeting end request to the service providing apparatus 30 (step S203). The service providing apparatus 30 transmits a result for the meeting end request as a response.

As described heretofore, in the meeting service system 1 according to the present embodiment, the electronic meeting is ended in response to pressing of the meeting end button at the relay apparatus 20. When a shortened URL is accessed from the terminal apparatus 10 after the meeting end button is pressed by the above-described meeting termination process, an access to the shared board that was displayed before the meeting end button is denied, and a new shared board and a new personal board are generated.

In the present embodiment, a description is given above of an example in which the relay apparatus 20 transmits the meeting end request to the service providing apparatus 30 at step S203. However, in another example, the process of step S203 can be omitted.

In this case, even after the electronic meeting ends, the shared board and the personal board used in the meeting are not deleted. This allows the user of the terminal apparatus 10 to enter the shared board URL or the personal board URL into the web browser 100 to use the shared board or the personal board that was used in the meeting that was terminated.

Figure 11:
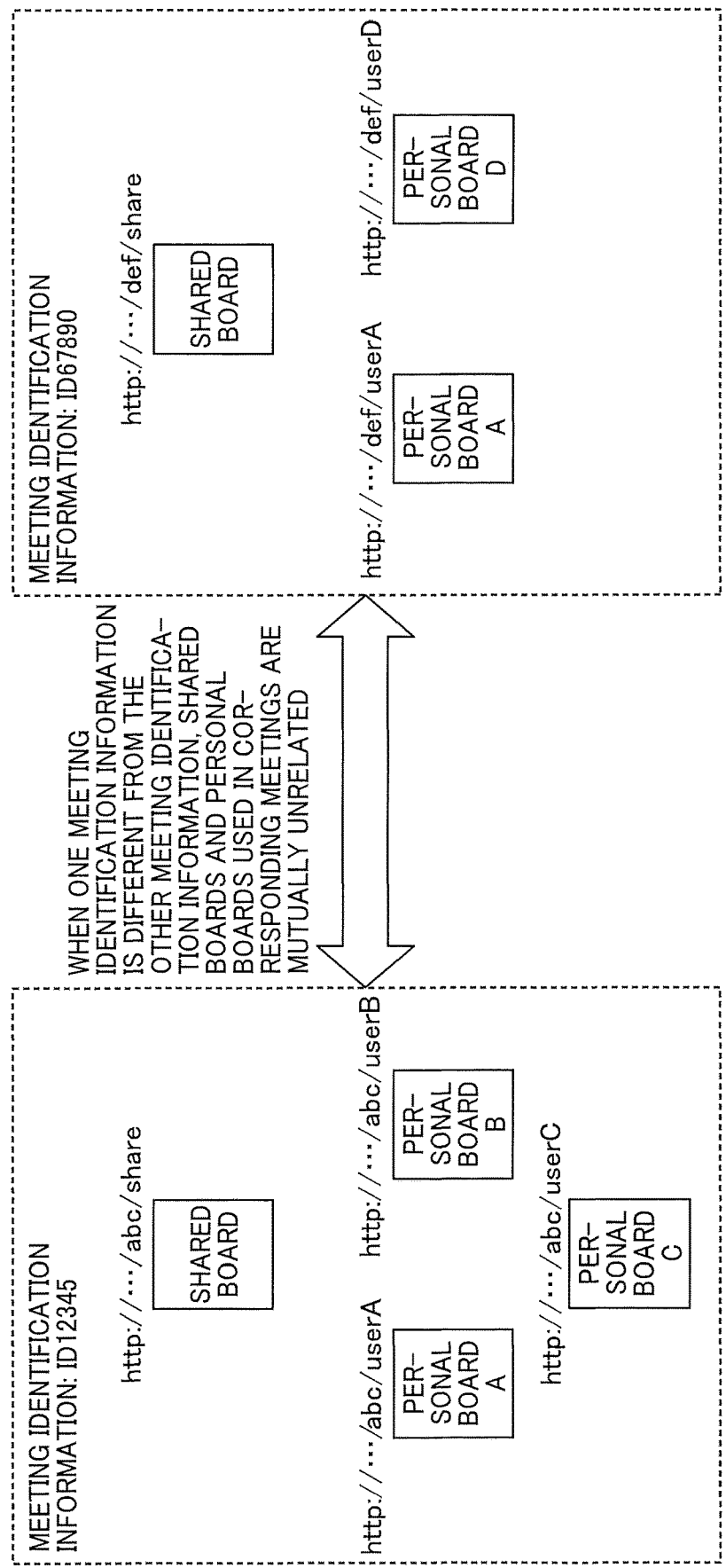
FIG. 11 is a diagram schematically illustrating a relation between a shared board and a personal board, according to embodiments of the present disclosure.

A relation between the shared board and the personal board is illustrated in FIG. 11. FIG. 11 is a diagram schematically illustrating the relation between the shared board and the personal board.

It is assumed that as illustrated in FIG. 11 a personal board A, a personal board B and a personal board C are used as well as a shared board in a given electronic meeting identified by meeting identification information of ID12345. Further, it is assumed that the electronic meeting identified by the meeting identification information of ID12345 is terminated, and subsequently a new electronic meeting identified by meeting identification information of ID67890 is started, and a personal board A and a personal board D are used as well as a shared board.

In this case, the shared board and the personal boards used in the electronic meeting whose meeting identification information is ID12345 and the shared board and the personal board used in the electronic meeting whose meeting identification information is ID67890 are mutually unrelated. In other words, URLs of these shared boards and personal boards are different from one another.

For example, a URL of the shared board used in the electronic meeting whose meeting identification information is ID12345 is different from a URL of the shared board used in the electronic meeting whose meeting identification information is ID67890. Further, for example, a URL of the personal board A used in the electronic meeting whose meeting identification information is ID12345 is different from a URL of the personal board A used in the electronic meeting whose meeting identification information is ID67890.

In another example, an expiration date can be set for the shared board and the personal board. In this case, for example, when the expiration date has passed after the end of the electronic meeting, the shared board and the personal board are deleted. Further, different expiration dates can be set for the shared board and the personal board, respectively.

Second Embodiment

Hereinafter, a description is given of a second embodiment of the present disclosure. In the second embodiment, determination as to whether a shared board needs to be generated and determination as to whether a personal board needs to be generated are performed by the service providing apparatus 30.

In the following description of the second embodiment, differences from the first embodiment are mainly described, and description of components which are substantially the same as those in the first embodiment is appropriately omitted.

<Functional Configuration>

Figure 12:
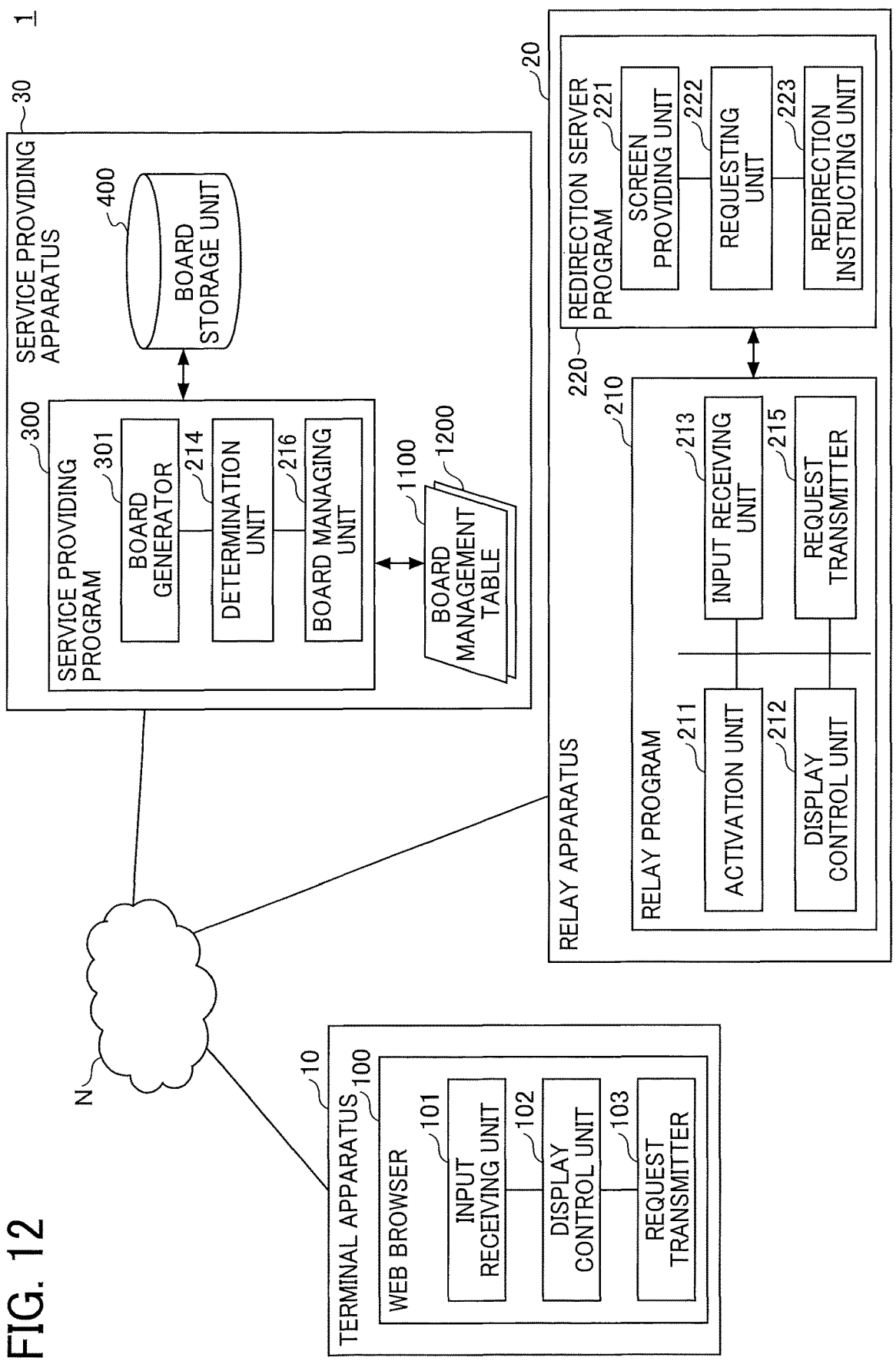
FIG. 12 is a diagram illustrating an example of a functional configuration of the meeting service system, according to the second embodiment of the present disclosure.

First, referring to FIG. 12, a functional configuration of the meeting service system 1 is described according to the present embodiment. FIG. 12 is a diagram illustrating an example of a functional configuration of the meeting service system 1, according to the second embodiment. The functional configuration of the terminal apparatus 10 according to the second embodiment is the same or substantially the same as that of the first embodiment described with reference to FIG. 4. Therefore, a redundant description thereof is omitted below.

<<Relay Apparatus 20>>

As illustrated in FIG. 12, the relay apparatus 20 according to the present embodiment does not include the determination unit 214 and the board management unit 216. Further, the relay apparatus 20 according to the present embodiment does not include the board management table 1100 and the board management table 1200.

<<Service Providing Apparatus 30>>

As illustrated in FIG. 12, the service providing apparatus 30 according to the present embodiment additionally includes the determination unit 214 and the board management unit 216. These functional units are implemented by processes that the service providing program 300 causes the CPU 507 to execute. Further, the service providing apparatus 30 according to the present embodiment includes the board management table 1100 and the board management table 1200.

The functions or processes implemented by the determination unit 214 and the board management unit 216 are the same or substantially the same as those of the first embodiment. Therefore, a redundant description thereof is omitted below. In addition, since the board management table 1100 and the board management table 1200 are also the same or substantially the same as those of the first embodiment. Therefore, a redundant description thereof is omitted below.

<Details of Operation>

Next, an operation performed by the meeting service system 1 is described in detail according to the present embodiment.

<<Meeting Start Process>>

Figure 13A:
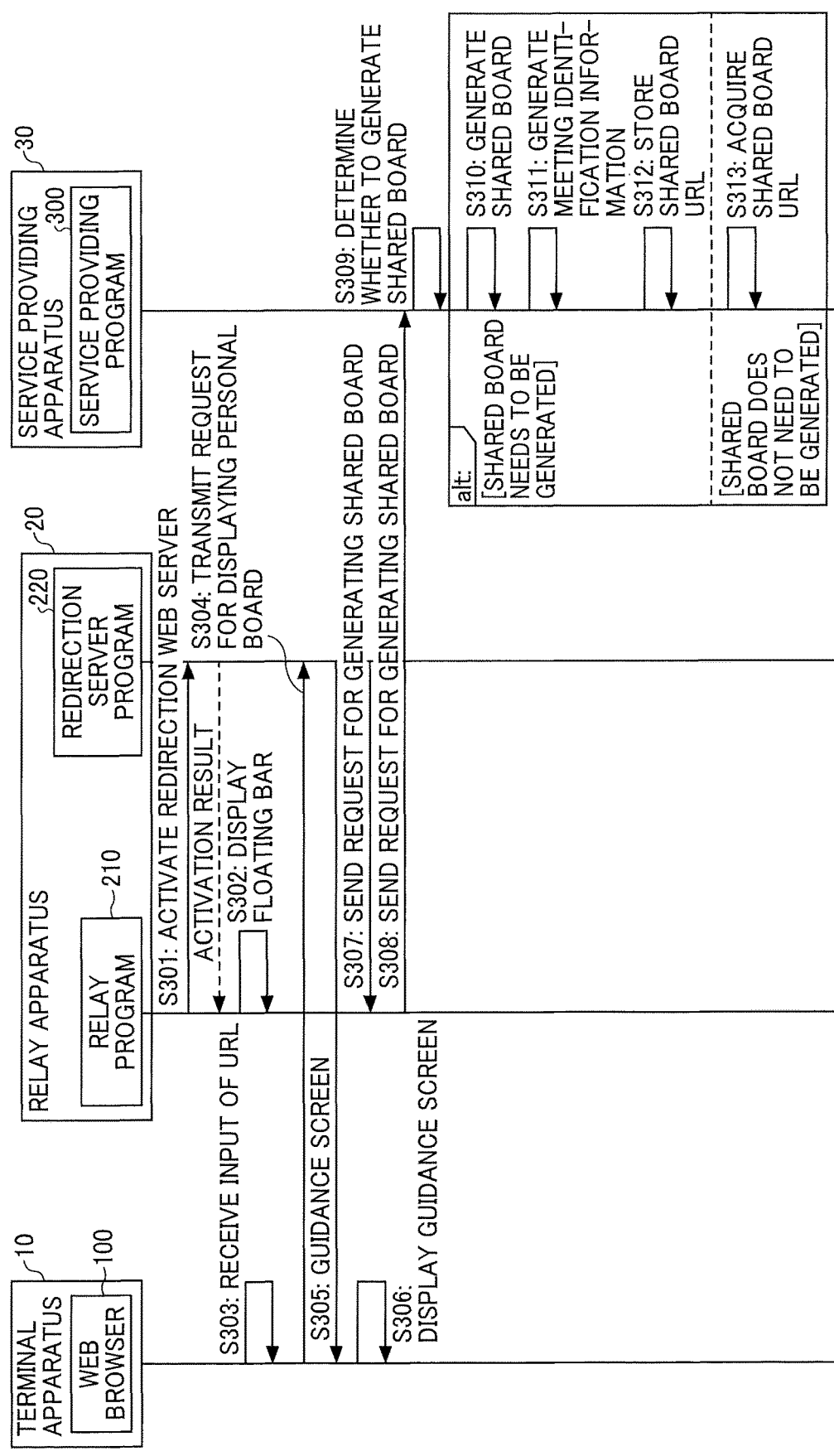

A description is given hereinafter of an example of an operation performed by the meeting service system 1 according to the present embodiment when starting an electronic meeting, with reference to FIGS. 13A and 13B. FIGS. 13A and 13B are a sequence diagram illustrating steps in an operation of starting a meeting, according to the second embodiment. The processes of steps S301 to S307, step S314 and steps S320 to S322 in FIGS. 13A and 13B are performed in substantially the similar manner as described above referring to steps S101 to S107, step S113, and steps S119 to S121 of FIGS. 6A and 6B, respectively, and the redundant description thereof is omitted below.

After the process of step S307, the request transmitter 215 of the relay program 210 transmits the shared board generation request to the service providing apparatus 30 (step S308).

The determination unit 214 of the service providing program 300 determines whether a shared board needs to be generated, referring to the board management table 1100 (step S309). This determination process can be performed in the same or substantially the same manner as described above referring to step S108 of FIG. 6A.

When the determination unit 214 determines in step S309 that the shared board needs to be generated, the board generator 301 of the service providing program 300 generates a shared board (step S310). The generated shared board is stored in the board storage unit 400.

Next, the board management unit 216 of the service providing program 300 generates meeting identification information (step S311).

Next, the board management unit 216 of the service providing program 300 stores the meeting identification information generated in step S311 in association with a URL (shared board URL) of the shared board generated in step S310 in the board management table 1100 (step S312).

By contrast, when the determination unit 214 determines in step S309 that a shared board needs not to be generated, the board management unit 216 of the service providing program 300 acquires the shared board URL from the board management table 1100 (step S313).

Then, the service providing program 300 transmits, to the relay apparatus 20, a generation result in response to the shared board generation request. The generation result includes a shared board URL of the shared board generated in step S310 or the shared board URL acquired in step S313.

After the process of step S314, the request transmitter 215 of the relay program 210 transmits the personal board generation request to the service providing apparatus 30 (step S315). The personal board generation request includes terminal identification information that identifies the terminal apparatus 10 as a request source of the personal board display request in step S304.

The determination unit 214 of the service providing program 300 determines whether a personal board needs to be generated, referring to the board management table 1200 (step S316). This determination process can be performed in the same or substantially the same manner as described above referring to step S114 of FIG. 6B.

When the determination unit 214 determines in step S316 that a personal board needs to be generated, the board generator 301 of the service providing program 300 generates a personal board of a user of the terminal apparatus 10 identified by the terminal identification information included in the personal board generation request (step S317). The generated personal board is stored in the board storage unit 400.

Next, the board management unit 216 of the service providing program 300 stores the meeting identification information, the terminal identification information included in the personal board generation request, and a URL (personal board URL) of the personal board generated in step S317 in association with one another in the board management table 1200 (step S318). This meeting identification information is meeting identification information associated with the shared board URL in the board management table 1100.

By contrast, when the determination unit 214 determines in step S316 that a personal board needs not to be generated, the board management unit 216 of the service providing program 300 acquires, from the board management table 1200, the personal board URL of the user of the terminal apparatus 10 identified by the terminal identification information included in the personal board generation request (step S319). Specifically, the board management unit 216 acquires, from the board management table 1200, the personal board URL that is associated with the meeting identification information associated with the shared board URL in the board management table 1100 and the terminal identification information included in the personal board generation request.

Then, the service providing program 300 transmits, to the relay apparatus 20, a generation result in response to the personal board generation request. The generation result includes a personal board URL of the personal board generated in step S317 or the personal board URL acquired in step S319.

As described heretofore, in the meeting service system 1 according to the present embodiment, the determination process as to whether a shared board needs to be generated and the determination process as to whether a personal board needs to be generated are performed by the service providing apparatus 30. This facilitate implementation of the relay program 210 installed in the relay apparatus 20 in the meeting service system 1 according to the present embodiment, when compared with the first embodiment.

<<Meeting Termination Process>>

Figure 14:
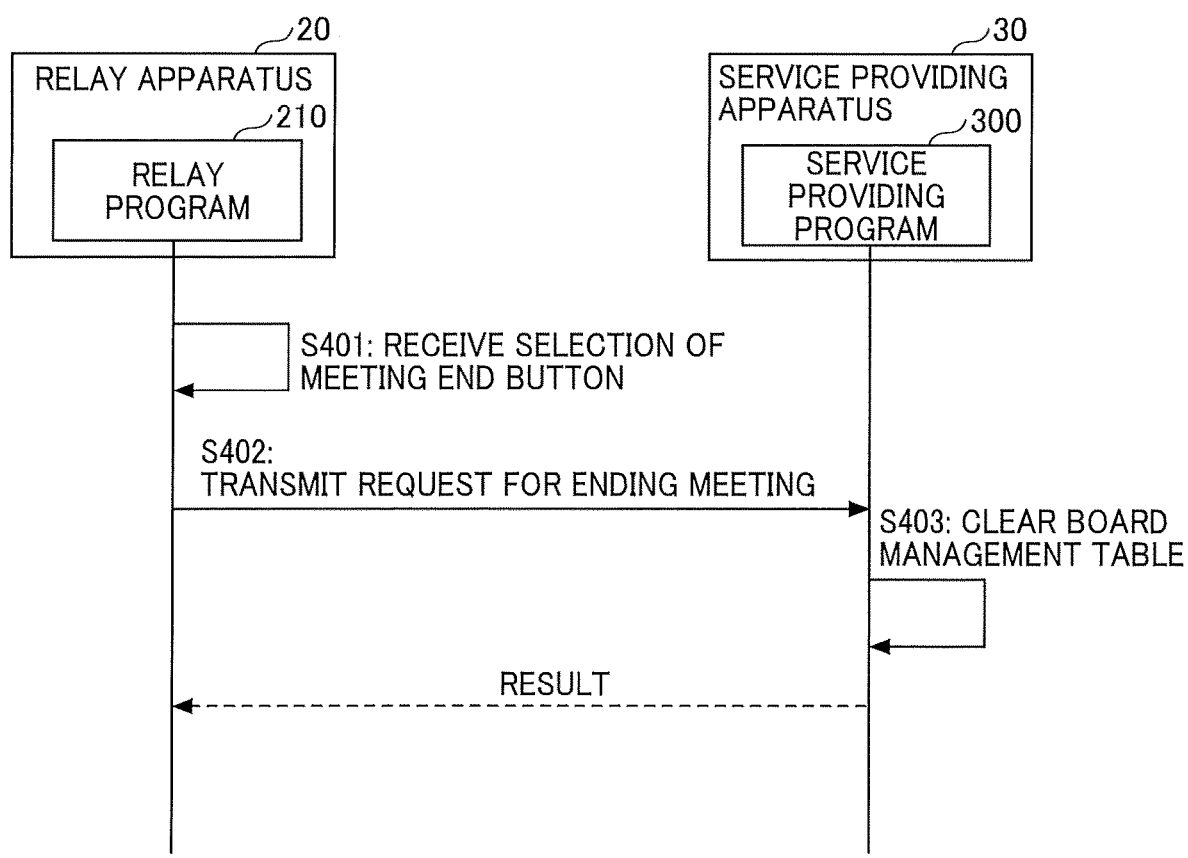
FIG. 14 is a sequence diagram illustrating steps in an operation of terminating a meeting, according to the second embodiment of the present disclosure.

A description is given hereinafter of an example of an operation performed by the meeting service system 1 according to the present embodiment when terminating an electronic meeting, with reference to FIG. 14. FIG. 14 is a sequence diagram illustrating steps in an operation of terminating a meeting, according to the second embodiment.

For example, it is assumed that a participant of an electronic meeting presses (enters) the meeting end button included in the floating bar being displayed on the relay apparatus 20. In response, the input receiving unit 213 of the relay program 210 receives the input of the meeting end button (step S401).

Next, the request transmitter 215 of the relay program 210 transmits a meeting end request to the service providing apparatus 30 (step S402).

The board management unit 216 of the service providing program 300 clears the board management table 1100 and the board management table 1200 (step S403).

As described above, in the meeting service system 1 according to the present embodiment, the service providing apparatus 30 clears the board management table 1100 and the board management table 1200.

Third Embodiment

Hereinafter, a description is given of a third embodiment of the present disclosure. In the third embodiment, an example case is described in which the meeting service system 1 does not include the relay apparatus 20.

In the following description of the third embodiment, differences from the first embodiment are mainly described, and description of components which are substantially the same as those in the first embodiment is appropriately omitted.

<Overview of System Configuration>

Figure 15:
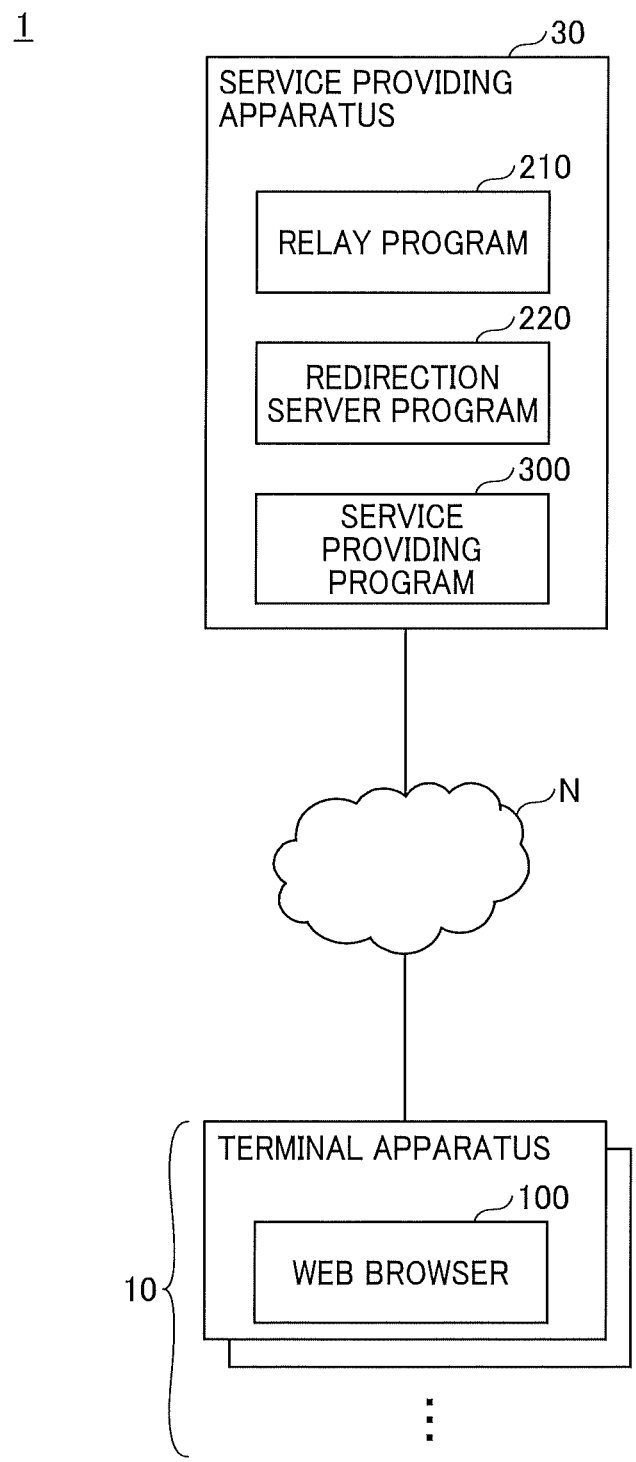
FIG. 15 is a diagram illustrating an example of an overall configuration of the meeting service system, according to the third embodiment of the present disclosure.

First, referring to FIG. 15, an example of an overall configuration of the meeting service system 1 is described according to the present embodiment. FIG. 15 is a diagram illustrating an example of an overall configuration of the meeting service system 1, according to the third embodiment.

As illustrated in FIG. 15, the relay apparatus 20 is not included in the meeting service system 1 according to the present embodiment. According to the present embodiment, the relay program 210 and the redirection server program 220 are included (installed) in the service providing apparatus 30. The functions or processes implemented by the relay program 210 and the redirection server program 220 are the same or substantially the same as those of the first embodiment. Therefore, a redundant description thereof is omitted below.

<Details of Operation>

Next, an operation performed by the meeting service system 1 is described in detail according to the present embodiment.

<<Meeting Start Process>>

Figure 16:
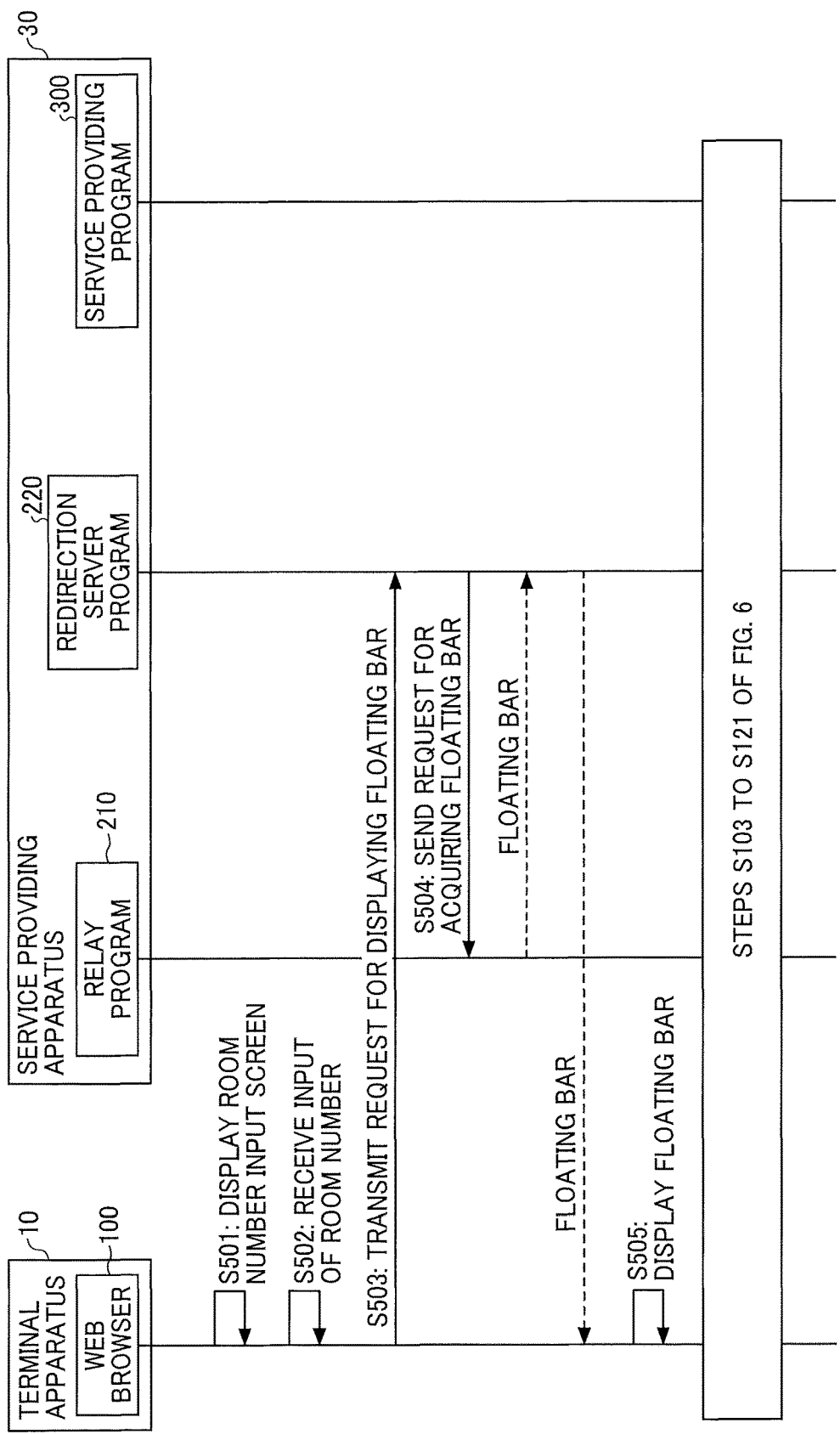
FIG. 16 is a sequence diagram illustrating steps in an operation of starting a meeting, according to the third embodiment of the present disclosure.

A description is given hereinafter of an example of an operation performed by the meeting service system 1 according to the present embodiment when starting an electronic meeting, with reference to FIG. 16. FIG. 16 is a sequence diagram illustrating steps in an operation of starting a meeting, according to the third embodiment.

First, the display control unit 102 of the web browser 100 displays a room number input screen (step S501). The room number input screen is a screen that allows a user to enter a room number. The room number is information for specifying a shortened URL. Specifically, the room number corresponds information indicating a room or a space where the relay apparatus 20 according to the first embodiment is located. In other words, in the first embodiment, a plurality of relay apparatuses 20 are respectively located in a plurality of rooms or spaces, for example, and the plurality of relay apparatuses 20 respectively display different shortened URLs. Therefore, in the third embodiment, the room number is used as what the room or the space where the relay apparatus 20 is located corresponds to.

It is assumed that a user of the terminal apparatus 10 enters the room number on the room number input screen. The input receiving unit 101 of the web browser 100 receives the input of the room number (step S502).

Next, the request transmitter 103 of the web browser 100 transmits a floating bar display request to the service providing apparatus 30 (step S503). This floating bar display request includes the room number of which input is received in step S502.

The requesting unit 222 of the redirection server program 220 transmits a floating bar acquisition request to the relay program 210 (step S504). In response to the floating bar acquisition request, the relay program 210 transmits a floating bar corresponding to the room number (more precisely, a web content for displaying the floating bar) to the redirection server program 220.

Then, the redirection server program 220 transmits the floating bar to the terminal apparatus 10.

In response to receiving the floating bar from the service providing apparatus 30, the display control unit 102 of the web browser 100 displays the floating bar (step S505). In this floating bar, a shortened URL corresponding to the room number of which input is received in step S502 is displayed.

Thereafter, in the meeting service system 1 according to the present embodiment, processes of steps S103 to S121 as described with reference to FIGS. 6A and 6B are performed.

As described heretofore, in the meeting service system 1 according to the present embodiment, an operation of starting an electronic meeting is implemented in the same or substantially the same manner as the first embodiment without using the relay apparatus 20. In this case, the shortened URL for starting the use of the electronic meeting is displayed in the floating bar on the terminal apparatus 10.

<<Meeting Termination Process>>

Figure 17:
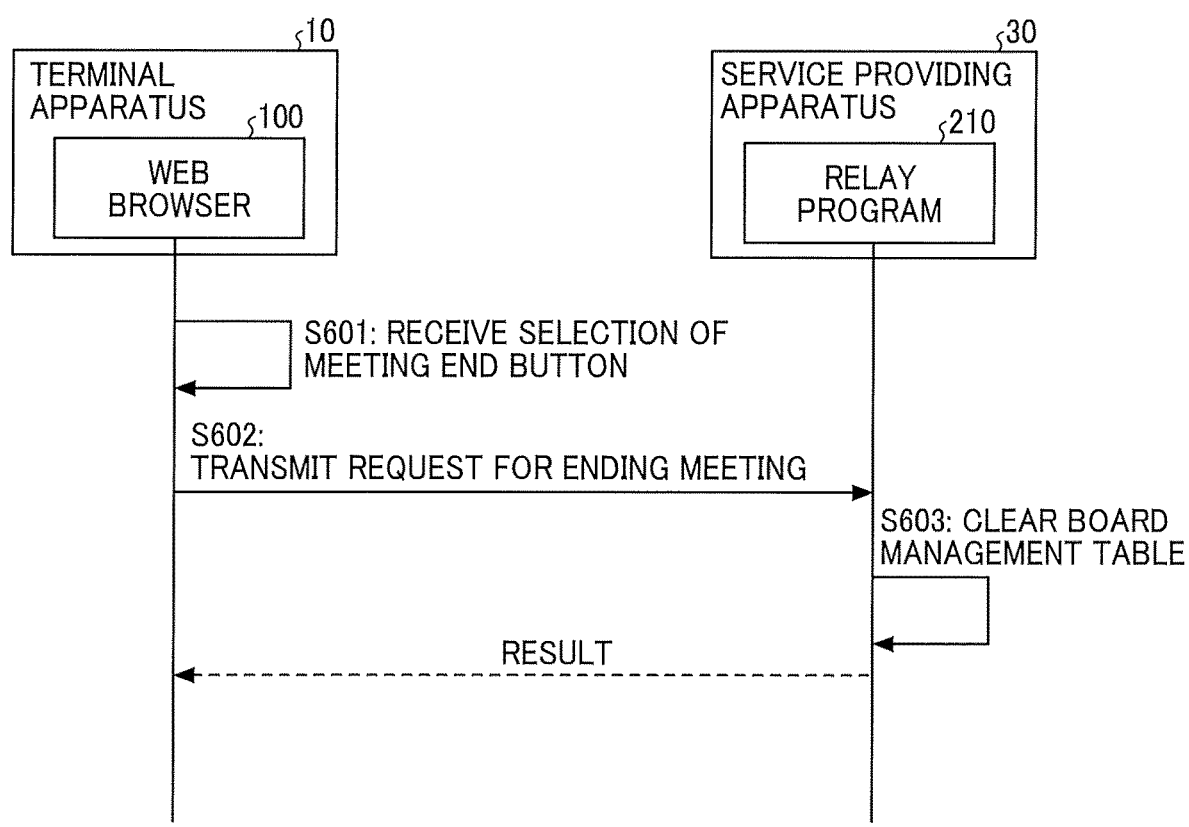
FIG. 17 is a sequence diagram illustrating steps in an operation of terminating a meeting, according to the third embodiment of the present disclosure.

A description is given hereinafter of an example of an operation performed by the meeting service system 1 according to the present embodiment when terminating an electronic meeting, with reference to FIG. 17. FIG. 17 is a sequence diagram illustrating steps in an operation of terminating a meeting, according to the third embodiment.

For example, it is assumed that a participant of an electronic meeting presses (enters) the meeting end button included in the floating bar being displayed on the terminal apparatus 10. The input receiving unit 101 of the web browser 100 receives the input of the meeting end button (step S601).

Next, the request transmitter 103 of the web browser 100 transmits a meeting end request to the service providing apparatus 30 (step S602).

The board management unit 216 of the relay program 210 clears the board management table 1100 and the board management table 1200 (step S603).

As described heretofore, in the meeting service system 1 according to the present embodiment, an operation of terminating an electronic meeting is implemented in the same or substantially the same manner as the first embodiment without using the relay apparatus 20. In this case, the meeting end button for terminating the use of the electronic meeting is displayed in the floating bar on the terminal apparatus 10.

In the related art, since personal contents are present for each of the participants participating in an electronic meeting, each participant sometimes needs to perform a complicated operation to access his/her personal contents.

For example, when a virtual whiteboard is generated for each participant as a personal content, each participant needs to input a URL or the like into a web browser to access his/her own whiteboard. Since different URLs are assigned to the participants respectively, each participant needs to check a URL of his/her personal content in advance and input the URL to the web browser correctly.

According to one or more embodiments of the present disclosure, access to a personal content by each participant participating in an electronic meeting can be facilitated.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing system, comprising circuitry to:

in response to an input of first address information for starting use of an electronic meeting service to one or more terminal apparatuses, send a request for one or more pieces of second address information to a relay apparatus and acquire one or more pieces of second address information that is generated by the relay apparatus based on the request for accessing personal contents to be used only by each of individual users through a web browser of corresponding one of the one or more terminal apparatuses in the electronic meeting service; and automatically, by the relay apparatus, redirect each of the one or more terminal apparatuses, in response to the first address information being input, to each of the acquired one or more pieces of second address information, respectively, said first address information being a uniform resource locator (URL) of a relay apparatus configured to relay communications between a service providing apparatus and the one or more terminal apparatuses within the information processing system, that is common to the one or more terminal apparatuses as participants in a same electronic meeting, and said one or more pieces of second address information being URLs that are different for each of the one or more terminal apparatuses that uses the same electronic meeting.

2. The information processing system of claim 1, wherein the circuitry is further configured to:

in response to the input of the first address information for starting the use of the electronic meeting service to the one or more terminal apparatuses, determine whether the personal contents of the one or more terminal apparatuses to which the first address information is input are already generated;

generate the personal contents of the one or more terminal apparatuses to which the first address information is input, based on a determination result indicating that the personal contents are not generated yet; and acquire the one or more pieces of second address information of the personal contents based on another determination result indicating that the personal contents are already generated, and wherein the circuitry redirects each of the one or more terminal apparatuses, to which the first address information is input, to the respective destination identified by each of the acquired one or more pieces of second address information or to the one or more pieces of second address information of the generated personal contents.

3. The information processing system of claim 2, wherein, the circuitry is further configured to:

determine whether a shared content to be shared and used by the one or more terminal apparatuses is already created; and generate the shared content based on a determination result indicating that the shared content is not generated yet.

4. The information processing system of claim 1, wherein the first address information is the URL having a short and simple expression.

5. The information processing system of claim 1, wherein the personal contents include a virtual whiteboard for each of individual users to use at each one of the one or more terminal apparatuses.

6. The information processing system of claim 1, wherein the one or more pieces of second address information are associated to identification information of the electronic meeting service and identified based on terminal apparatus identification information.

7. The information processing system of claim 1, wherein the automatically redirecting is performed by the relay apparatus when the relay apparatus automatically instructs the one or more terminal apparatuses to redirect to the one or more pieces of second address information in response to the first address information being input at the one or more terminal apparatuses.

8. An information processing apparatus, comprising circuitry to:
   in response to an input of first address information for starting use of an electronic meeting service to one or more terminal apparatuses, send a request for one or more pieces of second address information to a relay apparatus and acquire one or more pieces of second address information that is generated by the relay apparatus based on the request for accessing personal contents to be used only by each of individual users through a web browser of corresponding one of the one or more terminal apparatuses in the electronic meeting service; and
   automatically, by the relay apparatus, redirect each of the one or more terminal apparatuses, in response to the first address information being input, to each of the acquired one or more pieces of second address information, respectively, said first address information being a uniform resource locator (URL) of a relay apparatus configured to relay communications between a service providing apparatus and the one or more terminal apparatuses within the information processing system, that is common to the one or more terminal apparatuses as participants in a same electronic meeting, and said one or more pieces of second address information being URLs that are different for each of the one or more terminal apparatuses that uses the same electronic meeting.

9. An information processing method performed by an information processing apparatus, the method comprising:
   in response to an input of first address information for starting use of an electronic meeting service to one or more terminal apparatuses, sending a request for one or more pieces of second address information to a relay apparatus and acquiring one or more pieces of second address information that is generated by the relay apparatus based on the request for accessing personal contents to be used only by each of individual users through a web browser of corresponding one of the one or more terminal apparatuses in the electronic meeting service; and
   automatically, by the relay apparatus, redirecting each of the one or more terminal apparatuses, in response to which the first address information being is input, to each of the acquired one or more pieces of second address information, said first address information being a uniform resource locator (URL) of a relay apparatus configured to relay communications between a service providing apparatus and the one or more terminal apparatuses within the information processing system, that is common to the one or more terminal apparatuses as participants in a same electronic meeting, and said one or more pieces of second address information being URLs that are different for each of the one or more terminal apparatuses that uses the same electronic meeting.

\* \* \* \* \*